United States Patent [19]

Sugiyama

[11] Patent Number: 5,455,819
[45] Date of Patent: Oct. 3, 1995

[54] METHOD AND APPARATUS CAPABLE OF QUICKLY IDENTIFYING AN UNKNOWN SYSTEM EVEN ON OCCURRENCE OF A PLURALITY OF DISPERSIVE PORTIONS

[75] Inventor: Akihiko Sugiyama, Tokyo, Japan

[73] Assignee: NEC Corporation, Tokyo, Japan

[21] Appl. No.: 206,657

[22] Filed: Mar. 7, 1994

[30] Foreign Application Priority Data

Mar. 5, 1993 [JP] Japan ..................................... 5-045145
Dec. 28, 1993 [JP] Japan ..................................... 5-334310

[51] Int. Cl.$^6$ ..................................................... H04B 3/23
[52] U.S. Cl. ........................... 370/13; 370/32.1; 375/232; 379/3
[58] Field of Search ................... 370/32, 32.1, 13, 370/17; 375/14, 232; 379/410, 411, 3

[56] References Cited

U.S. PATENT DOCUMENTS 5,307,405  4/1994  Sih ...................................... 370/32.1 X
5,375,147  12/1994  Awata et al. ......................... 370/32.1 X

OTHER PUBLICATIONS

B. Widro et al. "Adaptive Noise Cancelling: Principles and Applications", vol. 63, No. 12, pp. 1692–1716, Dec. 1975 (Proceedings of the IEEE).

J. Nagumo et al. "A Learning Method for System Identification", vol. AC–12, No. 3, pp. 282–287 Jun. 1967 (IEEE Transactions on Automatic Control).

S. Ideda et al. "A Fast Convergence Algorithm for Adaptive Fir Filters W/ Coarsely Located Taps", pp. 1525–1528, May 14–17, 1991 (Proceedings of the ICASSP).

A. Sugiyama et al. "A Fast Algorithm for Adaptive Fir W/ Coarsely–Located Coefficients for Cancellation of Multiple Echoes", 1992, (C&C Systems Research Laboratories).

*Primary Examiner*—Melvin Marcelo
*Attorney, Agent, or Firm*—Sughrue, Mion, Zinn, Macpeak & Seas

[57] ABSTRACT

In an identification apparatus for identifying an unknown system in response to a transmission input signal and an echo signal which includes multiple echoes sent through the unknown system, a plurality of adaptive filters each of which has a plurality of taps are supplied with the transmission signal in parallel to individually identify the multiple echoes by successively modifying tap coefficients in each adaptive filter. Information is transmitted from a j-th adaptive filter to a (j+1)-th adaptive filter to identify each of the multiple echoes. Each adaptive filter monitors modification times of tap coefficients or ERLE. Alternatively, a step size is changed from one to another to be delivered to tap coefficient generators and to accomplish high speed convergence.

29 Claims, 20 Drawing Sheets

METHOD AND APPARATUS CAPABLE OF QUICKLY IDENTIFYING AN UNKNOWN SYSTEM EVEN ON OCCURRENCE OF A PLURALITY OF DISPERSIVE PORTIONS

BACKGROUND OF THE INVENTION

This invention relates to an identification apparatus and an identification method for identifying an unknown system by the use of an adaptive filter. It is to be noted here that such an adaptive filter is used as an echo canceler, a noise canceler, a howling canceler, an adaptive equalizer, and the like to identify the unknown system, such as a transmission line, an audio coupling path, although the following description will be mainly directed to the echo canceler for canceling an echo which occurs in a two-wire/four-wire hybrid included in an echo path.

In general, an echo canceler is operated so that an echo which leaks from a transmission side to a reception side in a four wire side of a two-wire/four-wire hybrid is canceled by generating an echo replica corresponding to a transmission signal by the use of an adaptive filter which has taps of a number covering a time interval longer than an impulse response of an echo path. In the adaptive filter, each magnitude of tap coefficients is adaptively modified or updated by monitoring a correlation between the transmission signal and an error signal obtained by subtracting an echo replica signal from a mixture of the echo and a reception signal.

As an algorithm for adaptively modifying tap coefficients in the adaptive filter, an LMS algorithm and a Learning Identification Method; LIM are disclosed in articles which are contributed by B. Widrow et al to Proceedings of IEEE, Volume 63, No. 12, December, 1975, pages 1692–1716 (will be called Document 1 hereinunder) and contributed by J. Nagumo et al to IEEE Transactions on Automatic Control, VOL. AC-12, No. 3, June, 1967, pages 282–287 (will be referred to as Document 2 hereinafter), respectively.

Practically, it is noted that the impulse response often includes a fixed delay or a flat delay portion and a dispersive portion which forms a substantial impulse response waveform. The flat delay portion depends on a distance between a position of the echo canceler and a position of the two-wire/four-wire hybrid. In this event, it is necessary to prepare the taps of a number which covers a time interval of a predicted maximum flat delay portion and another time interval of a dispersive portion representative of a substantial impulse response. Accordingly, a long flat delay portion brings about necessity of a huge number of the taps, an increase of a hardware size, and a long convergence time resulting from a cross interference among the tap coefficients.

In order to solve the above-mentioned problems, an adaptive control method is proposed which estimates the dispersive portion on a time axis by removing the flat delay portion from the impulse response and by adaptively controlling an arrangement of tap coefficients in an adaptive filter only at a local region adjacent to an estimated position. Such a method is proposed in a paper which is contributed by S. Ikeda et al to Proceedings of International Conference on Acoustics, Speech, and Signal Processing, May, 1991, pages 1525–1528 and which is entitled "A Fast Convergence Algorithm for Adaptive FIR Filters with Coarsely Located Taps" (will be called Document 3). More specifically, a location of a dispersive portion is at first coarsely estimated and arranges tap coefficients of taps constrained in the vicinity of the estimated location. With this structure, it is possible to shorten a convergence time.

In the meanwhile, the location of the dispersive portion is estimated by the use of a maximum absolute value of tap coefficients. In this connection, a single range of the constrained tap alone is indicated to arrange the tap coefficients. Accordingly, when a plurality of dispersive portions or multiple echoes are present in an impulse response, the constrained tap range should be expanded so that all of the dispersive portions or multiple echoes are covered. This means that, when a large flat delay is present between the dispersive portions, a convergence time becomes long because an effect which results from constraining the taps is reduced.

Furthermore, proposal has been made about a method which enables a high speed convergence even in the presence of the multiple echoes by allocating tap coefficients only to dispersive portions. Such a method is disclosed in a paper which is published on A-9, pages 1–93 (will be called Document 4) by A. Sugiyama et al on Autumnal Meeting 1992 of Electronics, Information, Communication Engineers Institute in Japan.

According to this method, a tap control range which is specified by each of tap control subgroups is successively changed from one to another over a whole of the taps. Therefore, a comparatively high speed convergence can be accomplished even when the plurality of the dispersive portions, such as the multiple echoes, are present in the impulse response. As a result, tap coefficients can be arranged only at the dispersive portions of the impulse response at a high speed.

In the above-mentioned method mentioned in Document 4, the control tap subgroups are changed from one to another at a predetermined or uniform time interval irrespective of a degree of significance of each control tap subgroup. This shows that a long time is necessary for calculating tap coefficients of taps which need not calculate the tap coefficients. In other words, similar calculations should be carried out even when the taps have a small probability of calculating the tap coefficients. In consequence, a convergence time becomes long in the above-mentioned method.

SUMMARY OF THE INVENTION

It is an object of this invention to provide an identification apparatus which is capable of quickly identifying an unknown system even when an impulse response includes a plurality of dispersive portions.

It is another object of this invention to provide an adaptive filter which is applicable to the above-mentioned identification apparatus.

It is still another object of this invention to provide an identification method which is capable of accomplishing a high speed convergence even when the plurality of the dispersive portions are included in the impulse response.

A method according to an aspect of this invention is for use in identifying an unknown system by the use of an adaptive filter having a plurality of taps assigned with consecutive tap numbers divided into a plurality of groups, the adaptive filter being supplied with a transmission input signal and a reception input signal which is sent through the unknown system and which exhibits an impulse response resulting from the unknown system. The impulse response is specified by a plurality of dispersive portions and a plurality of flat delay portions. The method comprises the steps of preparing first through K-th subadaptive filters which is obtained by dividing the adaptive filter and each of which has the taps having group tap numbers of each group and successively identifying at least one of the dispersive and the flat delay portions in the impulse response by successively controlling each of the first through the K-th subadaptive filters.

A method according to another aspect of this invention is for use in identifying an unknown system by the use of an adaptive filter having a plurality of taps assigned with consecutive tap numbers. The adaptive filter is supplied with a transmission input signal and a reception input signal which is sent through the unknown system and which exhibits an impulse response resulting from the unknown system. The impulse response is specified by a plurality of dispersive portions and a plurality of flat delay portions. The method comprises the steps of modifying tap coefficients of the taps by the use of a first step size until the tap coefficients are modified to obtain primary modified tap coefficients, thereafter modifying the primary modified tap coefficients by the use of a second step size greater than the first step size to obtain secondary modified tap coefficients, and successively identifying at least one of the dispersive and the flat delay portions in the impulse response by using the primary and the secondary modified tap coefficients.

An identification apparatus according to still another aspect of this invention is for use in identifying an unknown system by responding to a transmission input signal and a reception input signal which is sent through the unknown system and which includes an impulse response of an echo signal specified by a plurality of dispersive portions and a plurality of flat delay portions. The identification apparatus comprises first through K-th adaptive filters which are supplied with the transmission input signal in parallel and a feedback signal and each of which identifies at least one of the dispersive portions to produce first through K-th identification signals representative of results of identification in the first through the K-th adaptive filters, an adder circuit supplied with the first through the K-th identification signals for summing up the first through the K-th identification signals to produce an echo replica signal representative of a replica of the echo signal, a subtracter for subtracting the echo replica signal from the echo signal to produce an error signal, and means for supplying the first through the K-th adaptive filters with the error signal as the feedback signal.

An identification apparatus according to yet another aspect of this invention is for use in identifying an unknown system by responding to a transmission input signal and a reception input signal which is sent through the unknown system and which includes an impulse response of an echo signal to produce an identification signal representative of a result of identification. The identification apparatus comprises a delay circuit, which defines a first predetermined number of taps and which is supplied with the transmission input signal, for successively delaying the transmission input signal to produce successively delayed signals through the taps, respectively. The taps are assigned with consecutive tap numbers. The apparatus further comprises a path switch supplied with a path switching control signal and connected to the taps for selecting the taps of a second predetermined number smaller than the first predetermined number to selectively produce the successively delayed signals of the second predetermined number, coefficient calculation means of the second predetermined number connected to the path switch and supplied with the second predetermined number of the successively delayed signals and the error signal for calculating tap coefficients of the second predetermined number, production means connected to the path switch and the coefficient calculation means for producing the identification signals, and a tap controller connected to the path switch and the coefficient calculation means for supplying the path switch and the coefficient calculation means with a path switch control signal and a coefficient control signal to make the path switch switch the taps from one to another in response to the path switch control signal and to make the coefficient calculation means modify the tap coefficients in accordance with the coefficient control signal, respectively. The tap controller comprises coefficient control signal producing means for selectively producing the coefficient control signal which represent a selected one of a first step size and a second step size greater than the first step size.

A method according to another aspect of this invention is for use in identifying an unknown system by the use of an adaptive filter having a plurality of taps which are assigned with consecutively tap numbers and which are divisible into active and inactive taps. The method comprises the steps of classifying the taps into a plurality of tap control subgroups, preparing a plurality of queue memories which are in one-to-one correspondence to the tap control subgroups and which are for memorizing, in the form of queues, inactive tap numbers of the inactive taps which belong to the tap control subgroups, respectively, selecting, as a selected tap control subgroup, one of the tap control subgroups that includes the inactive tap numbers memorized in the corresponding queue memory, and successively modifying tap coefficients of the selected tap control subgroup by the use of a step size determined by active tap information related to each of tap coefficients assigned to the active taps.

An identification apparatus according to still another aspect of this invention is for use in identifying an unknown system by responding to a transmission input signal and a reception input signal which is sent through the unknown system and which includes an impulse response of an echo signal. The identification apparatus produces an identification signal representative of a result of identification and comprises a delay circuit, which defines a first predetermined number of taps divided into a plurality of subgroups and which is supplied with the transmission input signal, for successively delaying the transmission input signal to produce successively delayed signals through the taps, respectively. The taps are assigned with consecutive tap numbers and classified into the subgroups each of which includes active and inactive taps. The apparatus further comprises a path switch supplied with a path switching control signal and connected to the taps for selecting the taps of a second predetermined number smaller than the first predetermined number to selectively produce the successively delayed signals of the second predetermined number, coefficient calculation means of the second predetermined number connected to the path switch and supplied with the second predetermined number of the successively delayed signals and the error signal for calculating tap coefficients of the second predetermined number, production means connected to the path switch and the coefficient calculation means for producing the identification signal, and a tap controller connected to the path switch and the coefficient calculation means for supplying the path switch and the coefficient calculation means with a path switch control signal and a coefficient control signal to make the path switch switch the taps from one to another in response to the path switch control signal and to make the coefficient calculation means modify the tap coefficients in accordance with the coefficient control signal, respectively. The tap controller comprises monitoring means for monitoring active tap information determined by the tap coefficients of the active taps in each subgroup, varying means coupled to the monitoring means for varying a step size with reference to the active tap information, and supplying means for supplying the step size to the coefficient calculation means to modify the tap coefficients.

DESCRIPTION OF THE PREFERRED EMBODIMENTS

Prior Art

Figure 1:
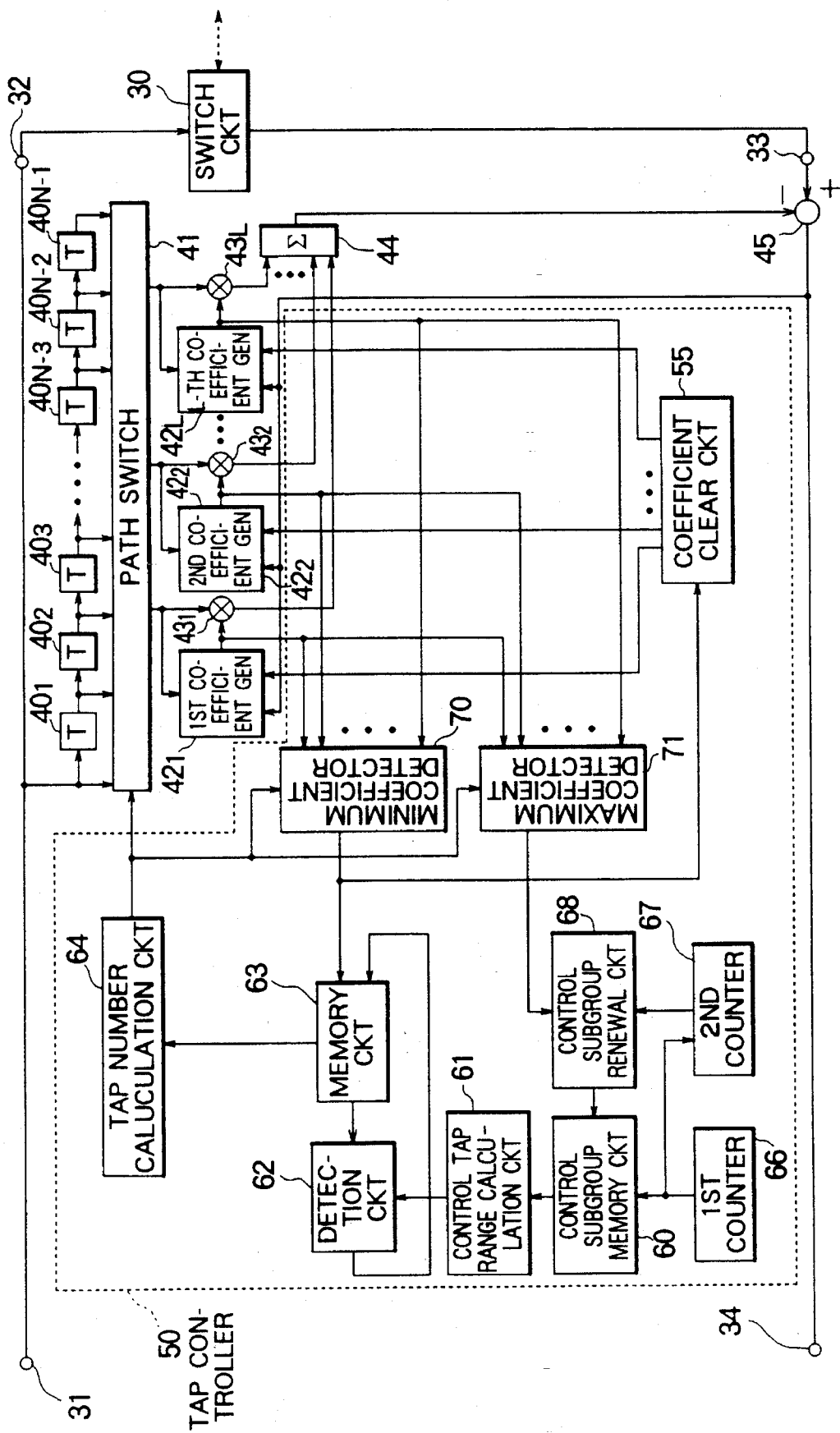
FIG. 1 is a block diagram for use in describing a conventional identification apparatus.

Referring to FIG. 1, description will be made about a conventional identification apparatus which is for use in identifying an unknown system and which may be, for example, an echo canceler, a noise canceler, a howling canceler, an adaptive equalizer, or the like, although the following description will be restricted to the echo canceler. Such an echo canceler is coupled to a two-wire/four-wire hybrid circuit 30 as the unknown system and is used to cancel an echo which leaks from a transmitter section to a receiver section in a four-wire side, as well known in the art.

In FIG. 1, the illustrated echo canceler is operable in accordance with the algorithm proposed in Document 4 referenced in the preamble of the instant specification and may be called an adaptive filter. As illustrated in FIG. 1, the echo canceler, namely, the adaptive filter comprises a transmission input terminal 31, a transmission output terminal 32, a reception input terminal 33, and a reception output terminal 34. The hybrid circuit 30 is connected between the transmission input terminal 31 and the reception input terminal 33. The reception input terminal 33 is given an input signal, namely, a reception input signal, which has flat delay portions and dispersive portions.

As shown in FIG. 1, the transmission input terminal 31 which is given a transmission input signal is directly connected to the transmission output terminal 32 and is also connected to a delay circuit which is composed of first through (N−1)-th delay units $40_1$ through $40_{N-1}$ connected in series to one another to define first through N-th taps where N is an integer greater than unity. With this structure, an undelayed signal is sent through the first tap while delayed signals are delivered through the second through the N-th taps. The first through the N-th taps are connected to a path switch 41 which has first through L-th switch output terminals where L is smaller than N.

Herein, it is to be noted that the illustrated echo canceler has the taps of a number such that the dispersive portions are substantially covered except for the flat delay portions.

From this fact, it is readily understood that the echo canceler serves to produce an echo replica signal by adaptively assigning tap coefficients to substantial dispersive portions of the reception input signal. In this connection, the echo canceler has the taps of a number such that the dispersive portion of the reception input signal can be covered.

In order to adaptively assign the tap coefficients to the substantial dispersive portions, a path switch 41 is arranged between the first through the N-th taps and the first through L-th switch output terminals to selectively connect the first through the N-th taps to the first through the L-th output terminals.

The first through the L-th switch output terminals of the path switch 41 are connected to first through L-th coefficient generators $42_1$ to $42_L$ for generating first through L-th tap coefficient signals representative of first through L-th tap coefficients, respectively. First through L-th switch output signals are sent through the first through the L-th switch output terminals, respectively.

The first through the L-th tap coefficient signals are given to first through L-th multipliers $43_1$ to $43_L$ connected to the first through the L-th switch output terminals of the path switch 41. As a result, the first through the L-th multipliers $43_1$ to $43_L$ produce first through L-th multiplication results or product signals representative of first through L-th products of the switch output signals and the first through the L-th tap coefficient signals, respectively. The first through the L-th product signals are summed up by an adder circuit 44. The adder circuit 44 produces a sum signal representative of a sum of the first through the L-th product signals. The sum signal is sent to a subtracter 45 as an echo replica signal representative of an echo replica.

Herein, it is to be noted that the transmission input signal is sent from the transmission input terminal 31 through the transmission output terminal 32 and the hybrid circuit 30 to the two-wire side. However, the transmission input signal partially leaks through the hybrid circuit 30 into the reception input terminal 33 as an echo signal representative of an echo due to impedance mismatching and the like.

The echo signal is sent to the subtracter 45 supplied with the echo replica signal. The subtracter 45 subtracts the echo replica signal from the echo signal to produce an error signal representative of an error or a difference between the echo signal and the echo replica signal. The error signal is sent to the reception output terminal 34 on one hand and is delivered to the first through the L-th coefficient generators $42_1$ to $42_L$ on the other hand.

Figure 2:
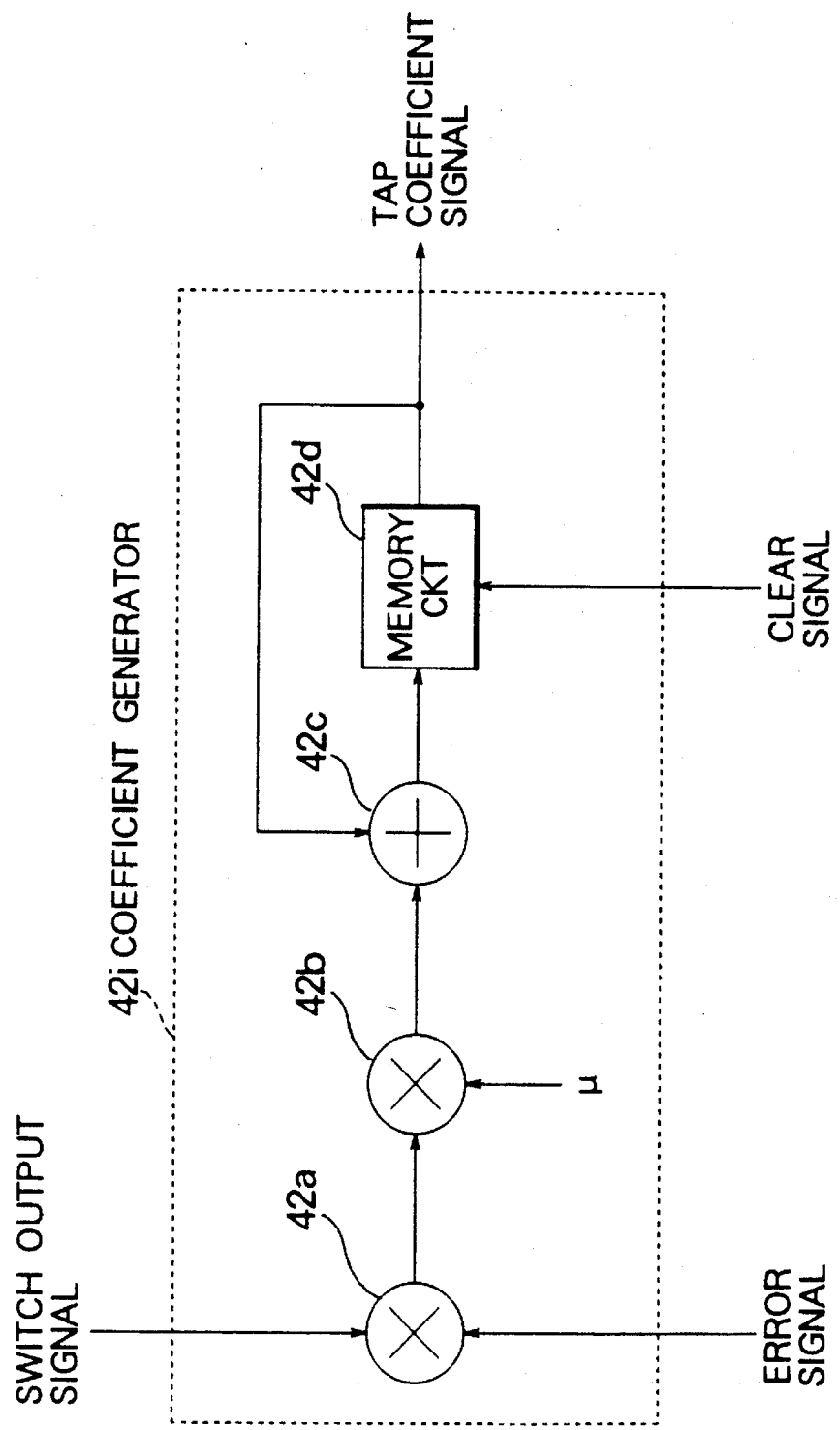
FIG. 2 is a block diagram of a coefficient generator used in the identification apparatus illustrated in FIG. 1.

Temporarily referring to FIG. 2, a coefficient generator depicted at $42_i$ is exemplified which is used as each of the first through the L-th coefficient generators $42_1$ to $42_L$ illustrated in FIG. 1 where i is a positive integer between 1 and L, both inclusive. Herein, it is assumed that each tap coefficient is modified by the use of the least mean square (LMS) algorithm disclosed in Document 1 referenced in the preamble of the instant specification. As shown in FIG. 2, the coefficient generator $42_i$ comprises a first multiplier 42a for multiplying the error signal by the switch output signal to produce a first product signal representative of a product of the error signal and the switch output signal. The first product signal is multiplied in a second multiplier 42b by a constant signal μ indicative of a predetermined constant to supply an adder 42c with a second product signal. The adder 42c adds or sums up the second product signal to a tap coefficient signal stored in a memory circuit 42d to feed a sum signal indicative of a sum of the tap coefficient signal and the second product signal to the memory circuit 42d. The sum signal is stored in the memory circuit 42d as a tap coefficient signal which is supplied to the multiplier $43_i$ (FIG. 1). In the illustrated example, the memory circuit 42d is given a clear signal, as will become clear later, to forcibly put contents of the memory circuit 42d into a zero state.

As illustrated in FIG. 1, the first through the L-th multipliers $43_1$ to $43_L$ which form tap coefficient multiplication paths are connected only to partial ones of the first through the N-th taps that are selected by the path switch 41. Hereinafter, taps which are connected to the tap coefficient multiplication paths will be called active taps while taps which are not connected to the tap coefficient multiplication paths will be called inactive taps. Such active and inactive taps are adaptively determined in a manner to be described later. In an initial state, the tap coefficient multiplication paths are arranged at an equidistance in the first through the N-th taps. In other words, the active taps are initially determined at the equidistance and connected to the first through the L-th multipliers and the first through the L-th coefficient generators $42_1$ to $42_L$ while the remaining taps are determined as the inactive taps.

In FIG. 1, the illustrated echo canceler further comprises a tap controller 50 for controlling a switching operation of the path switch 41 between the first through the N-th taps and the first through the L-th switch output terminals. This shows that the active and the inactive taps are adaptively determined under control of the tap controller 50.

Specifically, the illustrated tap controller 50 comprises a coefficient clear circuit 55 for delivering the clear signal to the first through the L-th coefficient generators $42_1$ to $42_L$ to put the memory circuit 42d of each coefficient generator $42_1$ to $42_L$ into the zero state, as mentioned before. To this end, a control subgroup memory circuit 60 is included in the tap controller 50 so as to memorize the number of the subgroups each of which is composed of a plurality of consecutive tap numbers. The number of the taps included in each tap control subgroup may be an equal number. For example, when a total number N of the taps becomes equal to twenty and the number of the tap control subgroups becomes equal to five, the number of the taps included in each tap control subgroup is equal to four.

Herein, let each of the tap control subgroups be represented by G(i), where i is an integer selected between 1 and 5, both inclusive, the numbers of the taps included in each tap control subgroup are given by:

G(1)=1, 2, 3, and 4,
G(2)=5, 6, 7, and 8,
G(3)=9, 10, 11, and 12,
G(4)=13, 14, 15, and 16, and
G(5)=17, 18, 19, and 20.

In the initial state, the control subgroup memory circuit 60 successively indicates each subgroup number in the order from a smaller one to a larger one. This shows that, when the subgroup numbers held in the control subgroup memory circuit 60 are represented by Z(n) where n is the integer selected between 1 and 5, the subgroup numbers are initially set in the control subgroup memory circuit 60 into:

Z(1)=1,
Z(2)=2,
Z(3)=3,
Z(4)=4, and
Z(5)=5.

In the illustrated example, the control subgroup memory circuit 60 indicates a first address pointer that defines a readout position of the control subgroup memory circuit 60. In this connection, the control subgroup memory circuit 60 produces Z(1)=1 in the above-mentioned example.

Moreover, the tap controller 50 further comprises a control tap range calculation circuit 61 connected to the control subgroup memory circuit 60, a detection circuit 62 connected to the control tap range calculation circuit 61, a memory circuit 63 for memorizing the inactive tap numbers, and a tap number calculation circuit 64 connected to the memory circuit 63. In addition, the illustrated tap controller 50 comprises first and second counters 66 and 67, a control subgroup renewal circuit 68, a minimum coefficient detector 70, and a maximum coefficient detector 71.

In the example being illustrated, the memory circuit 63 is connected to the detection circuit 62 and the minimum coefficient detector 70 and is structured by a first-in first-out memory. Specifically, the memory circuit 63 serves to memorize the inactive tap numbers which are equal in number to (N–L), where N is the number of the total taps and L, the number of the active taps. In addition, the tap number calculation circuit 64 which is connected to the memory circuit 63 calculates the active tap numbers by removing the inactive tap numbers from all of the tap numbers and supplies the active tap numbers to the path switch 41 as a path switch control signal for switching the taps from one to another.

The path switch 41 selects the active taps, L in number, which correspond to the active tap numbers received from the tap calculation circuit 64. Thus, the active taps are connected to the first through the L-th coefficient generators $42_1$ to $42_L$.

Herein, it is assumed that the inactive tap numbers, namely, initial values initially set in the memory circuit 63 are successively selected from a smaller one of all tap numbers. For example, it is assumed that the number of the total taps N is equal to 20, the number of the active taps L is equal to 3, and the number of the inactive taps N–L is equal to 17 and all of the taps are consecutively numbered from unity to twenty (20). Under the circumstances, three taps which have smaller tap numbers are selected as the active tap numbers and may be 1, 2, and 3 in the above-mentioned example. This means that the memory circuit 63 initially memorizes or sets the inactive tap numbers which are specified by the tap numbers 4, 5, . . . , and 20.

After the above-mentioned initial setting, coefficient modification is carried out in connection with the active taps selected by the path switch 41. In this state, when such coefficient modification is executed Q times where Q is a positive integer, positions of the active taps, namely, coefficient arrangements are renewed or updated in the following manner to be described hereinunder. Such a renewal operation will be referred to as a tap position renewal operation.

As shown in FIG. 1, the memory circuit 63 cooperates with the minimum coefficient detector 70 in a manner to be mentioned hereinunder. In the illustrated example, the minimum coefficient detector 70 is connected to the tap calculation circuit 64 and the first through the L-th coefficient generators $42_1$ to $42_L$. In this connection, the minimum coefficient detector 70 is supplied with the active tap numbers and the tap coefficient signals from the tap calculation circuit 64 and the coefficient generators $42_1$ to $42_L$, respectively. This shows that the first through the L-th tap coefficient signals are given from the coefficient generators $42_1$ to $42_L$ to the minimum coefficient detector 70.

The minimum coefficient detector 70 selects, from the first through the L-th tap coefficient signals, a tap coefficient signal which represents a minimum absolute value and which may be called a selected tap coefficient signal. Thereafter, the minimum coefficient detector 70 produces the active tap number which corresponds to the selected tap coefficient signal and which is supplied to the memory circuit 63 and the coefficient clear circuit 55.

Responsive to the selected active tap number, the coefficient clear circuit 55 sends the clear signal to the coefficient generator $42_i$ to which the selected active tap number is assigned. As a result, the selected tap coefficient signal which has the minimum absolute value is set into zero.

On the other hand, the selected active tap number is memorized into the memory circuit 63 through the minimum coefficient detector 70. Inasmuch as the memory circuit 63 is structured by the first-in first-out memory which has a top or leading portion and a tail or trailing portion and which memorizes the inactive tap numbers in the form of a queue, as mentioned before, the selected active tap number is memorized in the trailing portion of the first-in first-out memory 63. Thus, the selected active tap number is located in a tail of the queue while a tap number located at the top of the queue is transmitted as a top tap number to the detection circuit 62 connected to the control tap range calculation circuit 61.

The control tap range calculation circuit 61 is supplied from the control subgroup memory circuit 60 with the tap control subgroup number Z(n). In this event, the control tap range calculation circuit 61 detects the corresponding subgroup G(Z(n)) composed of a plurality of tap numbers as mentioned before and also detects, from the tap numbers, a minimum tap number $K_{min}$ and a maximum tap number $K_{max}$. Thus, both the minimum and the maximum tap numbers $K_{min}$ and $K_{max}$ are sent from the control tap range calculation circuit 61 to the detection circuit 62.

For example, when the tap control subgroup number Z(n)=1, the corresponding subgroup G(Z(n)) is specified by G(1)=1, 2, 3, 4. Therefore, the control tap range calculation circuit 61 produces 4 and 1 as the maximum and the minimum tap numbers $K_{max}$ and $K_{min}$, respectively, and supplies them to the detection circuit 62 which is given the top tap number from the memory circuit 63. The maximum and the minimum tap numbers $K_{max}$ and $K_{min}$ serve to determine a judging condition of the detection circuit 62. In other words, the detection circuit 62 carries out a detection operation in accordance with the judging condition in a manner to be described hereinunder.

When the top tap number is greater than 4 or smaller than 1, the detection circuit 62 feeds the top tap number back to the memory circuit 63 and reads another tap number out of the memory circuit 63 again. Such operation is repeated between the detection circuit 62 and the memory circuit 63 until the top number falls within the subgroup in question, namely, while the judging condition is satisfied.

After the detection circuit 62 detects that the judging condition is satisfied, an inactive tap number memorized in the memory circuit 63 is ascertained by the detection circuit 62. This means that a new active tap is determined.

As mentioned before, the tap position control is executed which is restricted to a specific one of the tap control subgroups. With this structure, it is possible to concentrically arrange the tap coefficients.

Next, description will be made about changing the tap control subgroups from one to another. Such a changing operation of tap control subgroups is carried out by the use of the first and the second counters 66 and 67, the control subgroup renewal circuit 68, the control subgroup memory circuit 60, and the maximum coefficient detector 71.

More specifically, the first counter 66 counts modification times of tap coefficients to produce a control signal each time when the modification times reach predetermined times. Accordingly, the control signal indicates to change the control subgroups and is sent from the first counter 66 to the control subgroup memory circuit 60 and the second counter 67.

Responsive to the control signal, the control subgroup memory circuit 60 advances an address pointer by one and reads a following tap control subgroup number out of a next address pointed by the address pointer. On the other hand, the second counter 67 counts the control signals sent from the first counter 66 to produce an additional control signal for updating or renewing an order of the control subgroups each time when the control signal is counted up to the total number of the tap control subgroups.

Supplied with the first through the L-th tap coefficient signals and the active tap numbers which are sent from the coefficient generators $42_1$ to $42_L$ and the tap calculation circuit 64, the maximum coefficient detector 71 detects, at every subgroup, a particular one of the tap coefficients that has a maximum absolute value. Such an absolute value may be referred to as a coefficient absolute value. The illustrated maximum coefficient detector 71 arranges the coefficient absolute values in an order from a larger one to a smaller one to obtain arranged coefficient absolute values and produces the tap control subgroup numbers which correspond to the arranged coefficient absolute values in the above-mentioned order and which are sent as control signals to the control subgroup renewal circuit 68.

Responsive to the control signal for renewing the control subgroups sent from the second counter 67, the control subgroup renewal circuit 68 changes or rearranges the order of the tap control subgroups memorized in the control subgroup memory circuit 60. The rearrangement of the order can be readily carried out by supplying the control subgroup memory circuit 60 with the tap control subgroup numbers in the order sent from the maximum coefficient detector 71 and by successively memorizing the tap control subgroup numbers from a leading address of the control subgroup memory circuit 60 in the order.

As is mentioned before, a tap control range is successively shifted over all of the taps. Therefore, convergence can be accomplished at a comparatively high speed even when a plurality of dispersive portions, such as multiple echoes, are included in the input signal. In addition, it is possible to determine the tap coefficient multiplication paths only at the dispersive portions.

However, the illustrated echo canceler has shortcomings as mentioned in the preamble of the instant specification, because all of the tap control subgroups are changed from one to another after lapse of a constant time interval.

FIRST EMBODIMENT

Figure 3:
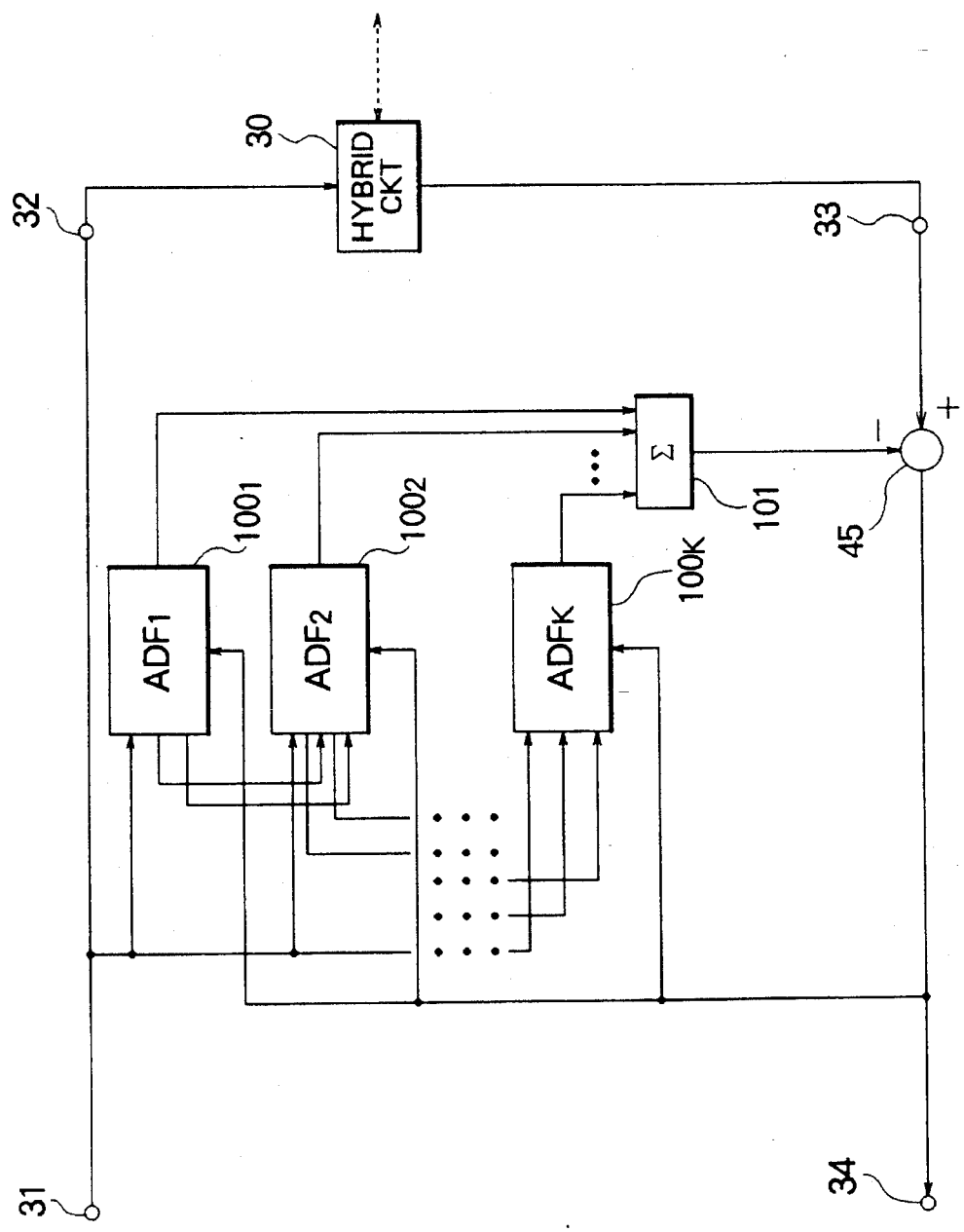
FIG. 3 is a block diagram of an identification apparatus according to a first embodiment of this invention.

Referring to FIG. 3, an identification apparatus according to a first embodiment of this invention is operable as an echo canceler, like in FIG. 1. In this connection, similar parts and terminals are designated by like reference numerals.

It is to be noted that the echo canceler comprises first through K-th adaptive filters (ADF1 to ADFk) $100_1$ to $100_k$ each of which is similar in structure and operation, as will become clear later, and all of which are connected to an adder 101 connected to a subtracter 45 as shown in FIG. 1, where K is a positive integer greater than unity. The first through the K-th adaptive filters $100_1$ to $100_k$ which may be called subadaptive filters are connected in parallel to the transmission input terminal 31 and are therefore supplied with a transmission input signal in parallel through the transmission input terminal 31. In addition, the first through the K-th adaptive filters $100_1$ to $100_k$ supply first through K-th filter output signals to the adder 101. All of the first through the K-th filter output signals are summed up by the adder 101 to be sent as an echo replica signal to the subtracter 45 which is given an echo signal sent through the hybrid circuit 30 and the reception input terminal 33, like in FIG. 1. The echo replica signal is representative of a replica of the echo signal. The subtracter 45 subtracts the echo replica signal from the echo signal to produce an error signal which is representative of a difference between the echo replica signal and the echo signal. The error signal is delivered from the subtracter 45 to the reception output terminal 34 on one hand and fed back to the first through the K-th adaptive filters $100_1$ to $100_k$ on the other hand.

Figure 4:
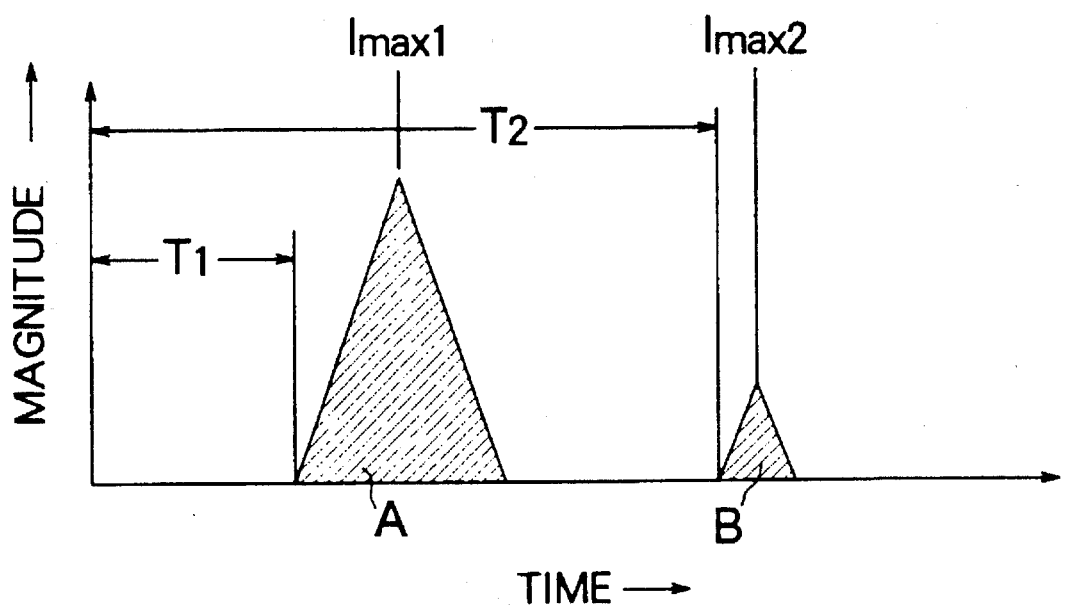
FIG. 4 shows a waveform of multiple echoes which can be removed by the identification apparatus illustrated in FIG. 3.

Temporarily referring to FIG. 4, an impulse response of multiple echoes is exemplified which has first and second dispersive portions A and B. In FIG. 4, it is assumed that the first dispersive portion A appears after a first flat delay time T1 while the second dispersive portion B appears after a second flat delay time T2 longer than the first flat delay time T1.

Referring to FIGS. 3 and 4, let the first and the second dispersive portions A and B of FIG. 4 be identified by the echo canceler illustrated in FIG. 3. In this event, K may be equal to two. In other words, the first and the second adaptive filters $100_1$ and $100_2$ alone may be used to identify the multiple echoes illustrated in FIG. 4 and are controlled to produce first and second echo replica signals which correspond to the first and the second dispersive portions A and B, respectively.

Specifically, the first adaptive filter $100_1$ is at first used to estimate the first flat delay time T1 and the second adaptive filter $100_2$ is used to estimate the second flat delay time T2.

Practically, estimation of the first and the second flat delay times T1 and T2 is carried out by the use of information which is representative of the tap numbers $I_{max1}$ and $I_{max2}$ (FIG. 2) which provide maximum absolute values of the tap coefficients within the first and the second dispersive portions A and B. Taking this into account, the tap number $I_{max1}$ is transmitted as a filter control signal from the first adaptive filter $100_1$ to the second adaptive filter $100_2$. The second adaptive filter $100_2$ compares the tap number $I_{max2}$ with the tap number $I_{max1}$ supplied from the first adaptive filter $100_1$ and determines a final tap number $I_{max2}$ in a manner to be described later on condition that the relationship of $I_{max1} < I_{max2}$ is always satisfied.

Similar operation is also carried out when the adaptive filters 100 (suffixes omitted) are greater than two. However, it is noted that control of $I_{max(j+1)}$ should be made between a j-th adaptive filter $100_j$ and a (j+1)-th adaptive filter $100_{j+1}$ so that the relationship of $I_{max(j)} < I_{max(j+1)}$ holds although description will be directed only to the case where the adaptive filters are equal in number to two.

Figure 5:
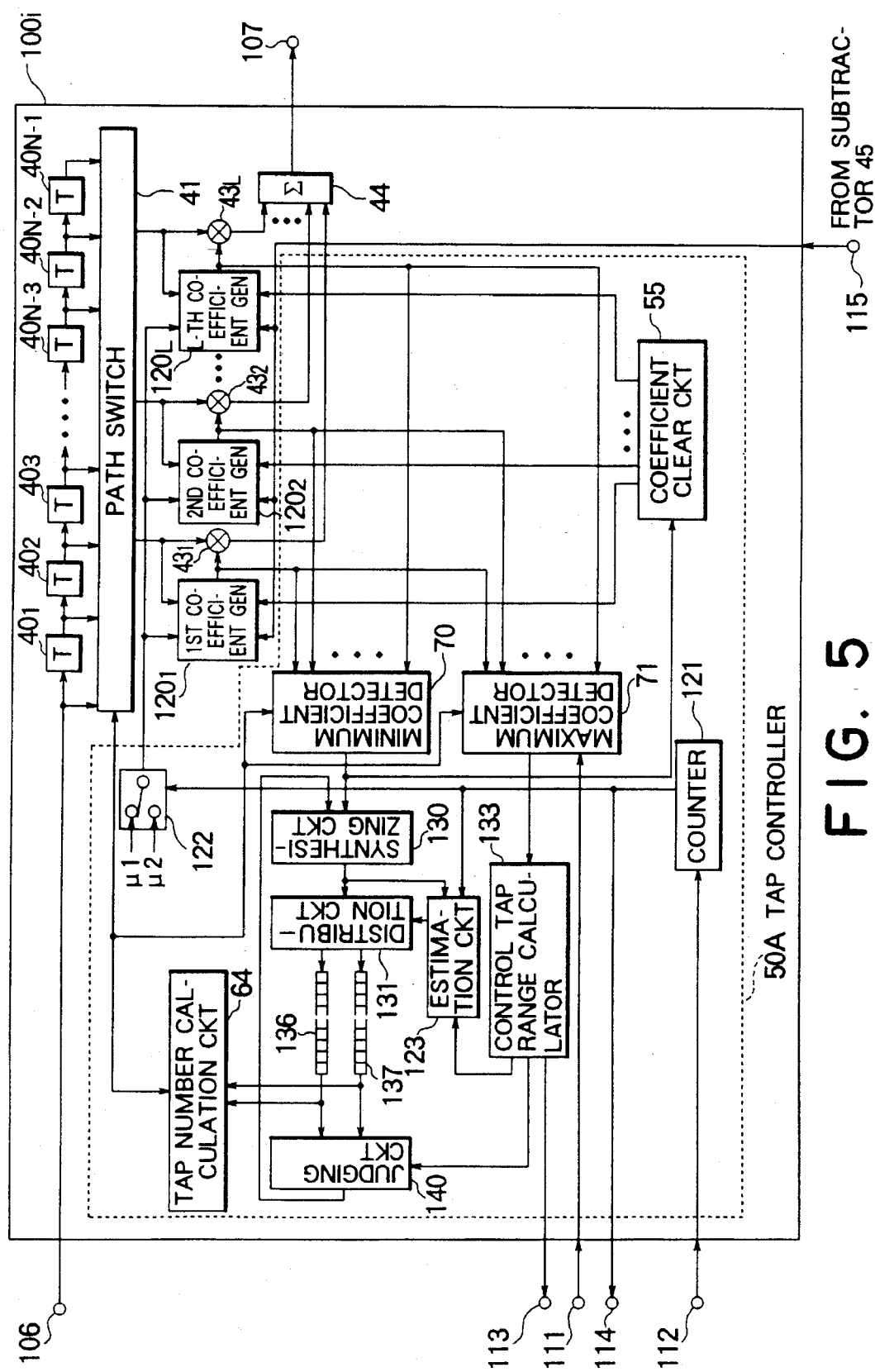
FIG. 5 is a block diagram of an adaptive filter which is applicable to the identification apparatus illustrated in FIG. 3.

Referring to FIG. 5, an adaptive filter $100_i$ is used as each of the first and the second adaptive filters $100_1$ and $100_2$ and has a filter input terminal 106 connected to the transmission input terminal 31 (FIG. 3), a filter output terminal 107 connected to the adder 101 (FIG. 3), first and second internal input terminals 111 and 112, first and second internal output terminals 113 and 114, and an error input terminal 115 connected to the subtracter 45 (FIG. 3), where i is a positive integer, namely, 1 or 2.

In FIG. 5, the illustrated adaptive filter $100_i$ comprises similar parts and elements which are illustrated in FIG. 1 and which are therefore depicted at like reference numerals and symbols, although a single adaptive filter alone is included in FIG. 1. As readily understood from FIG. 5, the adaptive filter 100 shown in FIG. 5 comprises first through L-th coefficient generators $120_1$ to $120_L$ somewhat different from those illustrated in FIG. 1 and a tap controller 50A comprising several components different from those shown in FIG. 1.

The transmission input signal is successively delayed by the first through the (N−1)-th delay units $40_1$ to $40_{N-1}$ which define the first through the N-th taps connected to the path switch 41. The path switch 41 is connected to the first through the L-th multipliers $43_1$ to $43_L$ which are supplied with first through L-th tap coefficient signals from the first through the L-th coefficient generators $120_1$ to $120_L$. The first through the L-th tap coefficient signals are representative of first through L-th tap coefficients. The first through the N-th taps are selectively connected through the path switch 41 to the first through the L-th multipliers $43_1$ to $43_L$ to form tap coefficient multiplication paths through the path switch 41 under control of the tap controller 50A.

At any rate, the first through the L-th multipliers $43_1$ to $43_L$ are given the first through the L-th switch output signals and the first through the L-th tap coefficient signals to produce first through L-th product signals representative of products of the first through the L-th switch output signals and the first through the L-th tap coefficient signals, respectively. The first through the L-th product signals are sent to the adder circuit 44 to be summed up and to be sent to the adder 101 (FIG. 5) as a sum signal through the filter output terminal 107. The sum signal is representative of a result of identification in the adaptive filter $100_i$ and may be called an identification result signal.

In the illustrated example, the error signal is delivered to the first through the L-th coefficient generators $120_1$ to $120_L$ through the error input terminal 115.

Figure 6:
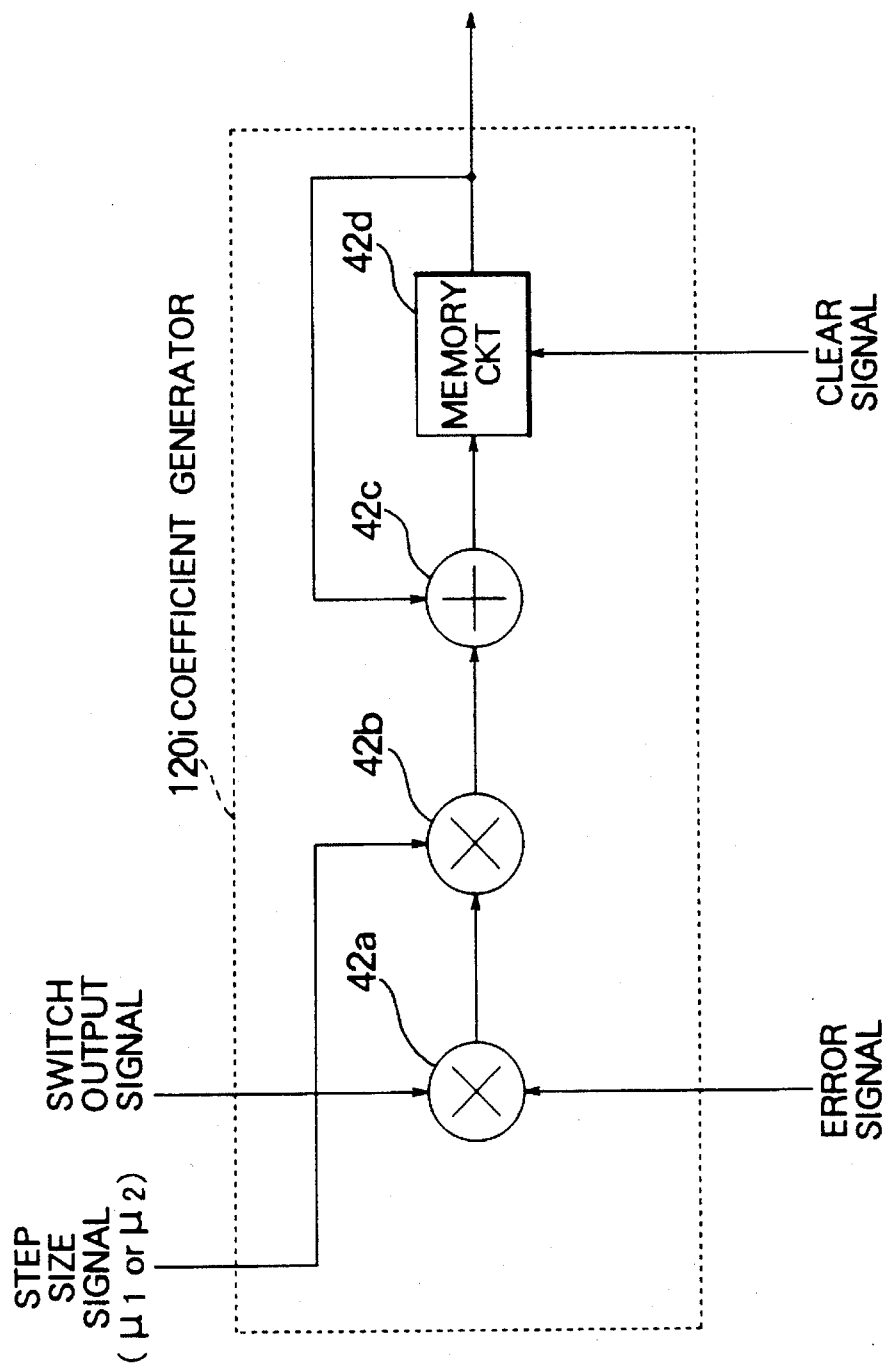
FIG. 6 is a block diagram for use in describing a coefficient generator illustrated in Fig, 5 in detail.

Temporarily referring to FIG. 6, the illustrated coefficient generator $120_i$ may be used as each of the first through the L-th coefficient generators $120_1$ to $120_L$ and comprises first and second multipliers 120a and 120b, an adder 120c, and a memory circuit 120d which are equivalent to those illustrated in FIG. 2. However, it is to be noted that the second multiplier 120b is supplied with a step size signal which is representative of a first step size ($\mu_1$) or a second step size ($\mu_2$) greater than the first step size ($\mu_1$). Thus, it is possible to change the step sizes from one to another outside of the illustrated coefficient generator $120_i$.

Turning back to FIG. 5, the tap controller 50A selectively indicates a first state specified by the first step size ($\mu_1$) or a second state specified by the second step size ($\mu_2$). To this end, the illustrated controller 50A comprises a counter 121 connected to the second internal input terminal 112. As illustrated in FIG. 3, the second internal input terminal 112 is connected to an (i−1)-th adaptive filter $100_{(i-1)}$, namely, the first adaptive filter $100_1$ in the example being illustrated. In this connection, the first adaptive filter $100_1$ has no second internal input terminal 112. In any event, the counter 121 monitors an operation state on the basis of modification times of the tap coefficients after adaptation is started by the adaptive filter $100_i$.

A result of monitoring is delivered as a monitoring result signal from the counter 121 to a step switch 122 and an estimation circuit 123. The monitoring result signal is sent from the adaptive filter $100_i$ to an adjacent one of the adaptive filters that may be the second adaptive filter $100_2$ through the second internal output terminal 114 when the illustrated adaptive filter $100_i$ is used as the first adaptive filter $100_1$. Alternatively, the monitoring result signal is sent to the third adaptive filter $100_3$ when the illustrated adaptive filter $100_i$ is used as the second adaptive filter $100_2$.

When the illustrated adaptive filter $100_i$ is used as the first adaptive filter $100_1$, the counter 121 is given a counter control signal from a control circuit (not shown) through the second internal input terminal 112. On the other hand, when the adaptive filter $100_i$ is used as the second adaptive filter $100_2$, the counter 121 is given the counter control signal through the second internal input terminal 112 from the second internal output terminal 114 of the first adaptive filter $100_1$.

In any event, commencement of adaptation is detected by the counter 121 by reception of the counter control signal. More specifically, let the adaptive filter $100_i$ take the first state in an initial state and the counter 121 produce the counter output signal of "0". The counter output signal of "0" is supplied to the estimation circuit 123, as mentioned before.

It is noted here that the illustrated estimation circuit 123 is connected to a synthesizing or combining circuit 130, a distribution circuit 131, and a control tap range calculator 133.

The synthesizing circuit 130 is connected to the minimum coefficient detector 70 and is supplied with a tap number of a tap which has a minimum absolute value of a tap coefficient signal and which may be referred to as a minimum coefficient tap number. The minimum coefficient tap number is sent through the synthesizing circuit 130 to the estimation circuit 123. On the other hand, the control tap range calculator 133 is connected to the maximum coefficient detector 71 and supplies the estimation circuit 123 with a control tap range signal representative of a control tap range specified by $I_{max} \pm L$. Supplied with the counter output signal, the minimum coefficient tap number, and the control tap range signal, the estimation circuit 123 estimates whether or not the minimum coefficient tap number falls within the control tap range $I_{max} \pm L$ and sends an estimation output signal to the distribution circuit 131.

The distribution circuit 131 is connected to the synthesizing circuit 130 and to first and second memory circuits 136 and 137 each of which is structured by a first-in first-out memory circuit and which are selectively connected to the synthesizing circuit 130 through the distribution circuit 131 controlled by the estimation circuit 123.

Responsive to the counter output signal of "0", the estimation circuit 123 sends the estimation output signal to the distribution circuit 131 such that the first memory circuit 136 is automatically selected by the distribution circuit 131. This shows that the first memory circuit 136 is selected by the distribution circuit 131 in the initial state because the counter output signal takes the "0" level in the initial state.

On the other hand, the step switch 122 selects the first step size ($\mu 1$) in the first state and the second step size ($\mu 2$) in the second state. Therefore, the first step size ($\mu 1$) is selected in the initial state by the step switch 122.

As mentioned above, the first step size ($\mu 1$) which is smaller than the second step size ($\mu 2$) is selected by the step switch 122 and is delivered to the first through the L-th coefficient generators $120_1$ to $120_L$. This shows that the tap coefficients are successively modified during the initial state in the first through the L-th coefficient generators $120_1$ to $120_L$ by the use of the first step size ($\mu 1$) smaller than the second step size ($\mu 2$). Accordingly, accurate detection is made during the initial state about a tap position at which the tap coefficient exhibits a maximum absolute value. Thus, a position of a substantial dispersive portion is accurately estimated in the initial state.

The tap coefficients are modified Q times where Q is a positive integer. After modification of the tap coefficients is carried out Q times, positions of the active taps are renewed or updated in the following manner. In this event, the minimum coefficient detector 70 is supplied with the active tap numbers and the first through the L-th tap coefficient signals from the tap number calculation circuit 64 and the first through the L-th coefficient generators $120_1$ to $120_L$. The minimum coefficient detector 70 produces a specific one of the active tap numbers that corresponds to a specific tap to which a minimum absolute value is assigned as the tap coefficient. The specific active tap number is delivered to the coefficient clear circuit 55 directly and to the distribution circuit 131 and the estimation circuit 123 through the synthesizing circuit 130. Supplied with the specific active tap number, the coefficient clear circuit 55 delivers the clear signal to the coefficient generator assigned with the specific active tap number, to clear the tap coefficient of the coefficient generator in question into zero.

Responsive to the estimation output signal, the distribution circuit 131 selects either the first memory circuit 136 or the second memory circuit 137. Specifically, the distribution circuit 131 selects the first memory circuit 136 when the tap number sent from the distribution circuit 131 falls within the control tap range. Otherwise, the distribution circuit 131 selects the second memory circuit 137. At any rate, each of the first and the second memory circuits 136 and 137 is successively loaded with the tap numbers as inactive tap numbers.

In the illustrated example, the inactive tap numbers are successively memorized from the distribution circuit 131 in a selected one of the first and the second memory circuits 136 and 137 that is selected by the distribution circuit 131.

The tap number calculation circuit 64 connected to the first and the second memory circuits 136 and 137 calculates the active tap numbers by removing the inactive tap numbers held in the first and the second memory circuits 136 and 137 and supplies the path switch 41 with the active tap numbers as a path switching control signal.

Supplied with the path switching control signal, the path switch 41 selects the active taps which are equal in number to L and which correspond to the active tap numbers. As a result, the active taps are connected to the first through the L-th coefficient generators $120_1$ to $120_L$ by switching the tap coefficient multiplication paths from one to another under control of the tap calculation circuit 64.

More particularly, description will be at first made about operation carried out in the initial state, namely, the first state. In the initial state, the first memory circuit 136 is used to be loaded with the inactive tap numbers as initial values. Such initial values are set into the first memory circuit 136 at an equidistance left between two adjacent ones of the taps. After the initial values are set into the first memory circuit 136 in the above-mentioned manner, renewal operation is successively carried out in connection with the tap coefficients of the active taps selected by the path switch 41.

A judging circuit 140 is connected to both the first and the second memory circuits 136 and 137 and is controlled in response to a selection control signal sent from the control tap range calculator 133. Specifically, the judging circuit 140 judges whether the tap number sent from the first memory circuit 136 is discarded or the tap number extracted from the first or the second memory circuit 136 or 137 is supplied to the synthesizing circuit 130.

In addition, the maximum coefficient detector 71 is supplied with the tap coefficient signals and the active tap numbers from the first through the L-th coefficient generators $120_1$ to $120_L$ and the tap calculation circuit 64 each time when the tap coefficients are modified. The maximum coefficient detector 71 supplies the control tap range calculator 133 with the active tap number $I_{max}$ of a tap which has a maximum absolute value.

The maximum coefficient detector 71 is given a range of $I_{max}\pm L$ through the first internal input terminal 111 from an adjacent one of the adaptive filters that is the first adaptive filter $100_1$ in the illustrated example, when the illustrated adaptive filer $100_i$ is used as the second adaptive filter $100_2$. This shows that the maximum coefficient detector 71 is controlled so that the active tap number does not exceed the range of $I_{max}\pm L$ given through the first internal input terminal 111.

The control tap range calculator 133 calculates a subsidiary range of $I_{max}\pm L$ as a calculated range by the use of the active tap number $I_{max}$ supplied from the maximum coefficient detector 71. The calculated range is given from the control tap range calculator 133 to the estimation circuit 123 on one hand and is sent through the first internal output terminal 113 to an adjacent one of the adaptive filters that may be, for example, the second adaptive filter $100_2$ on the other hand when the illustrated adaptive filter $100_i$ is used as the first adaptive filter $100_1$. In addition, the control tap range calculator 133 also delivers a judgement control signal to the judging circuit 140.

Specifically, when $I_{max}$ is varied and exceeds a predetermined threshold value, the control tap range calculator 133 supplies the judging circuit 140 with the judgement control signal such that the judging circuit 140 alternately derives the tap numbers from the first and the second memory circuits 136 and 137 by alternately selecting the first and the second memory circuits 136 and 137 and feeds the derived tap numbers back to the synthesizing circuit 130. On the other hand, when no variation of $I_{max}$ is detected, the control tap range calculator 133 supplies the judging circuit 140 with the judgement control signal to make the judging circuit 140 discard the tap number derived from the first memory circuit 136 which is selected by the distribution circuit 131.

Herein, such a variation of $I_{max}$ can be detected by monitoring whether or not Imax consecutively takes values different from a previous value a lot of times greater than a predetermined time.

The tap number which is fed back to the synthesizing circuit 130 from the judging circuit 140 is selectively given to the first or the second memory circuits 136 or 137 through the distribution circuit 131 in response to $I_{max}$ determined by the control tap range calculator 133. Through the above-mentioned procedure, the active tap number which is memorized in one of the first and the second memory circuits 136 and 137 can be moved to another one of the first and the second memory circuits 136 and 137 when $I_{max}$ is varied.

When the above-mentioned operation is carried out by the first and the second adaptive filters $100_1$ and $100_2$, it is possible for the first and the second adaptive filters $100_1$ and $100_2$ to estimate the first and the second flat delay times T1 and T2 which define the first and the second dispersive portions A and B, respectively. In this event, the information related to the first flat delay time T1 appears through the first internal output terminal 113 of the first adaptive filter $100_1$ in the form of the calculated range $I_{max}\pm L$ and is transmitted to the first internal input terminal 111 of the second adaptive filter $100_2$. When the first flat delay time T1, namely, $I_{max}$ is finally identified in the first adaptive filter $100_1$, the counter output signal is sent from the counter 121 of the first adaptive filter $100_1$ through the second internal output terminal 114 to the second internal input terminal 112 of the second adaptive filter $100_2$.

When the adaptive filters are greater in number to two, similar signal transmission may be carried out between a j-th one of the adaptive filters and a (j+1)-th one of the adaptive filters.

With this structure, a plurality of dispersive portions in multiple echoes are individually allocated to a plurality of the adaptive filters, such as $100_1$ and $100_2$ and are individually identified by the plurality of the adaptive filters. Therefore, it is possible to considerably shorten a convergence time necessary for identifying each dispersive portion in the echo canceler illustrated in FIG. 3.

SECOND EMBODIMENT

Figure 7:
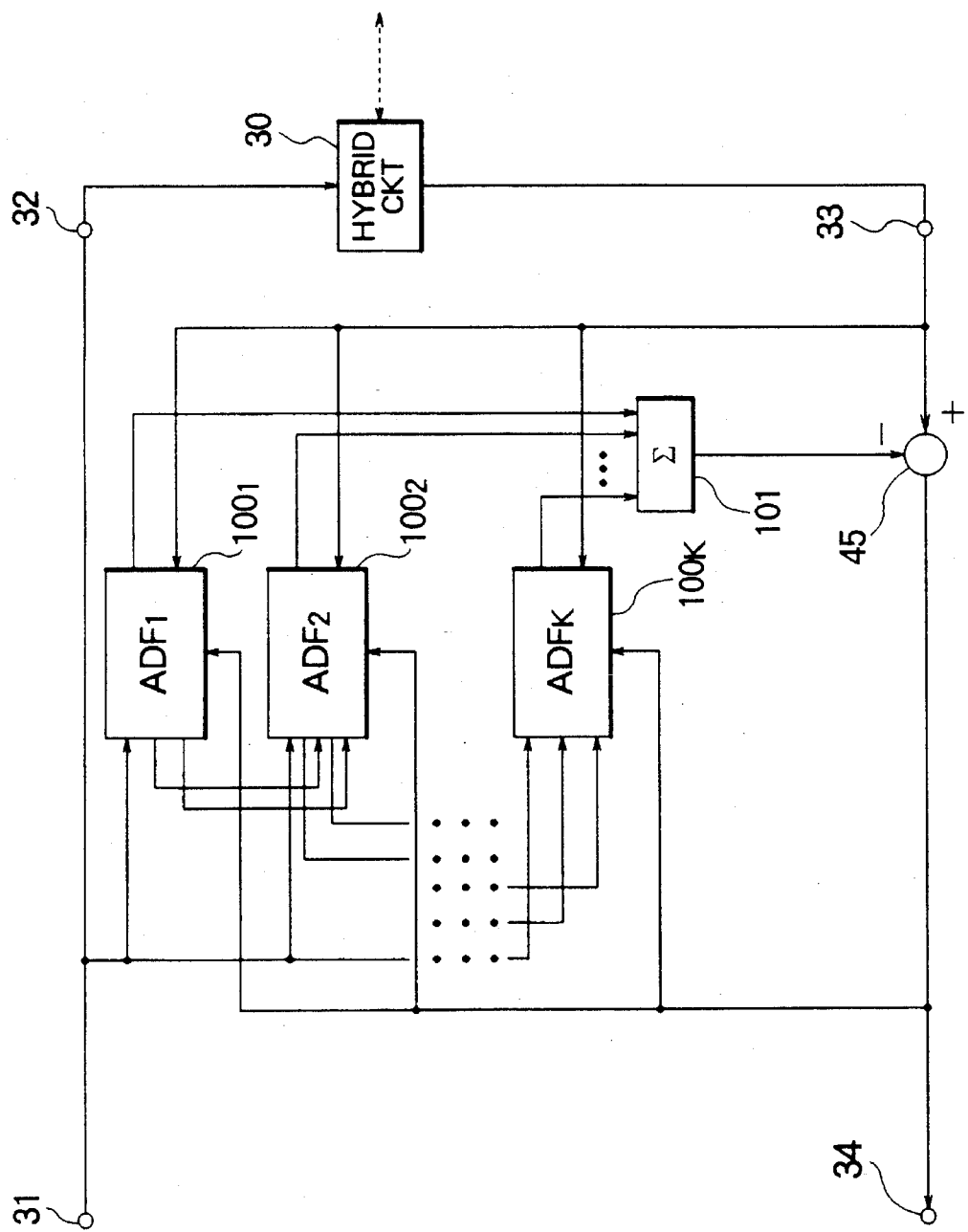
FIG. 7 is a block diagram of an identification apparatus according to a second embodiment of this invention.

Referring to FIG. 7, an identification apparatus according to a second embodiment of this invention is operable as an echo canceler and is similar to that illustrated in FIG. 3 except that the first through the K-th adaptive filters $100_1$ to $100_K$ are supplied with the echo signal from the hybrid circuit 30 through the reception input terminal 33.

Figure 8:
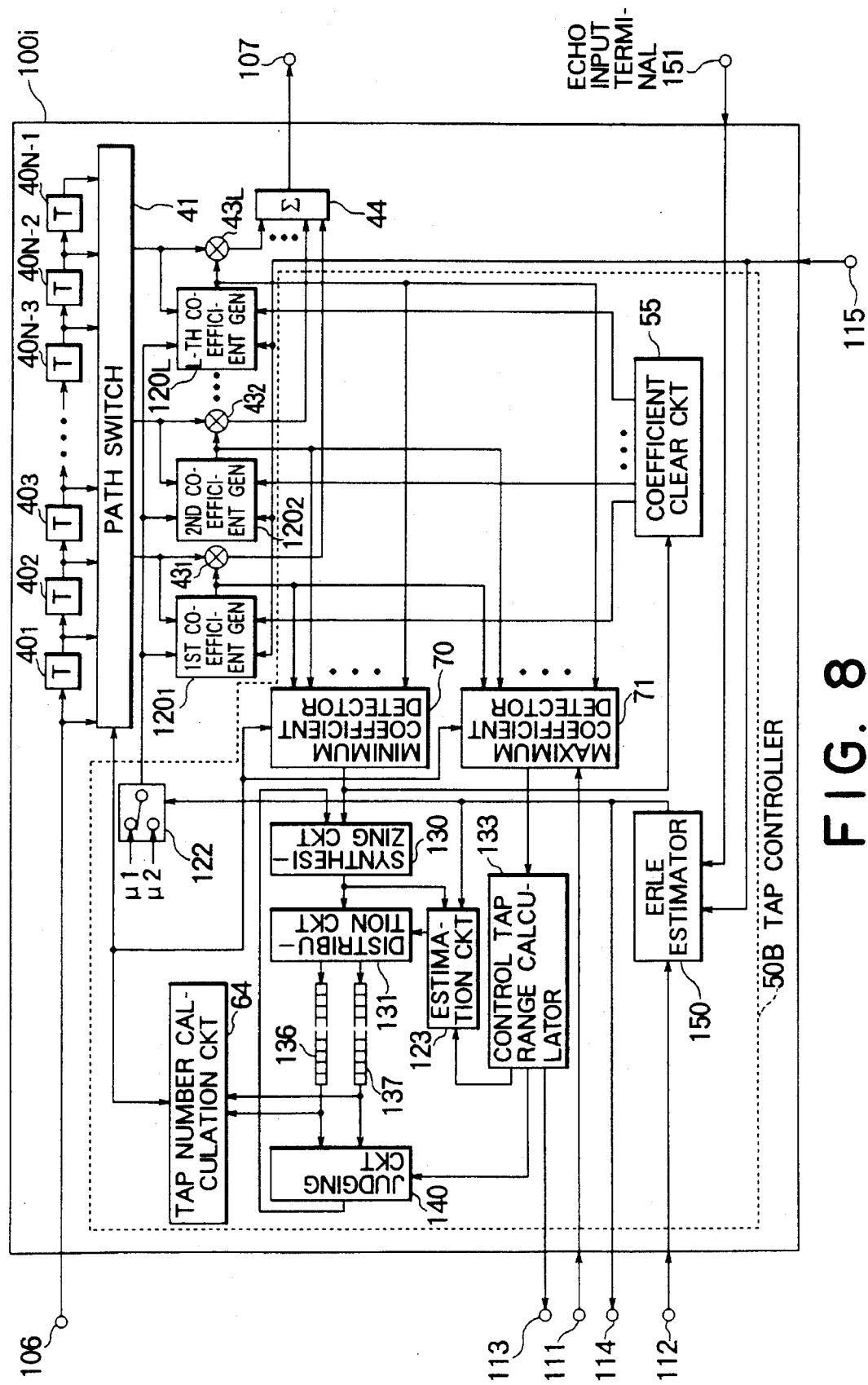
FIG. 8 is a block diagram of an adaptive filter which is applicable to the identification apparatus illustrated in FIG. 7.

Referring to FIG. 8 together with FIG. 7, an adaptive filter $100_i$ is applicable to each of the second through the (K–1)-th adaptive filters $100_2$ to $100_{K-1}$. In addition, the illustrated adaptive filter $100_i$ may be used as the first adaptive filter $100_1$ by eliminating the first and the second internal input terminals 111 and 112 and as the K-th adaptive filter $100_K$ by eliminating the first and the second internal output terminals 113 and 114, as readily understood from FIG. 7.

The adaptive filter $100_i$ illustrated in FIG. 8 is similar in structure to that illustrated in FIG. 5 except that the tap controller 50B comprises an echo return loss enhancement (ERLE) estimator 150 substituted for the counter 121 shown in FIG. 5. Therefore, description will be mainly directed to the ERLE estimator 150 hereinunder. In FIG. 8, the adaptive filter $100_i$ has an echo input terminal 151 which is supplied with the echo signal and which is connected to the ERLE estimator 150. Thus, the ERLE estimator 150 is connected to the error input terminal 115, the echo input terminal 151, and the second internal input terminal 112 when the adaptive filter $100_i$ is used as the second through the K-th adaptive filters $100_2$ to $100_K$. It is to be noted that the ERLE estimator 150 in the first adaptive filter $100_1$ is not connected to the second internal input terminal 112.

In any event, the ERLE estimator 150 is supplied with the error signal and the echo signal through the error input terminal 115 and the echo input terminal 151 to calculate the echo return loss enhancement (ERLE) which is obtained by dividing the echo signal by the error signal.

The ERLE estimator 150 compares the ERLE with a predetermined threshold level to produce a comparison result signal representative of a result of comparison. The comparison result signal is sent as a step size switch signal to the step switch 122 like in FIG. 3.

Herein, it is to be noted that the ERLE increases with an increase of iteration or modification of tap coefficients, as known in the art. Taking this into consideration, the step size switch signal is supplied from the ERLE estimator 150 to the step switch 122 to indicate that the ERLE is smaller than the predetermined threshold level. In other words, occurrence of such a step size switch signal is representative of the fact that modification of the tap coefficients is not carried out predetermined times.

The above description has been made on the assumption that two of the adaptive filters $100_i$ illustrated in FIGS. 5 and 8 are included in the echo canceler of FIG. 1. However, the echo canceler may include a single adaptive filter as shown in FIGS. 5 and 8.

Figure 9:
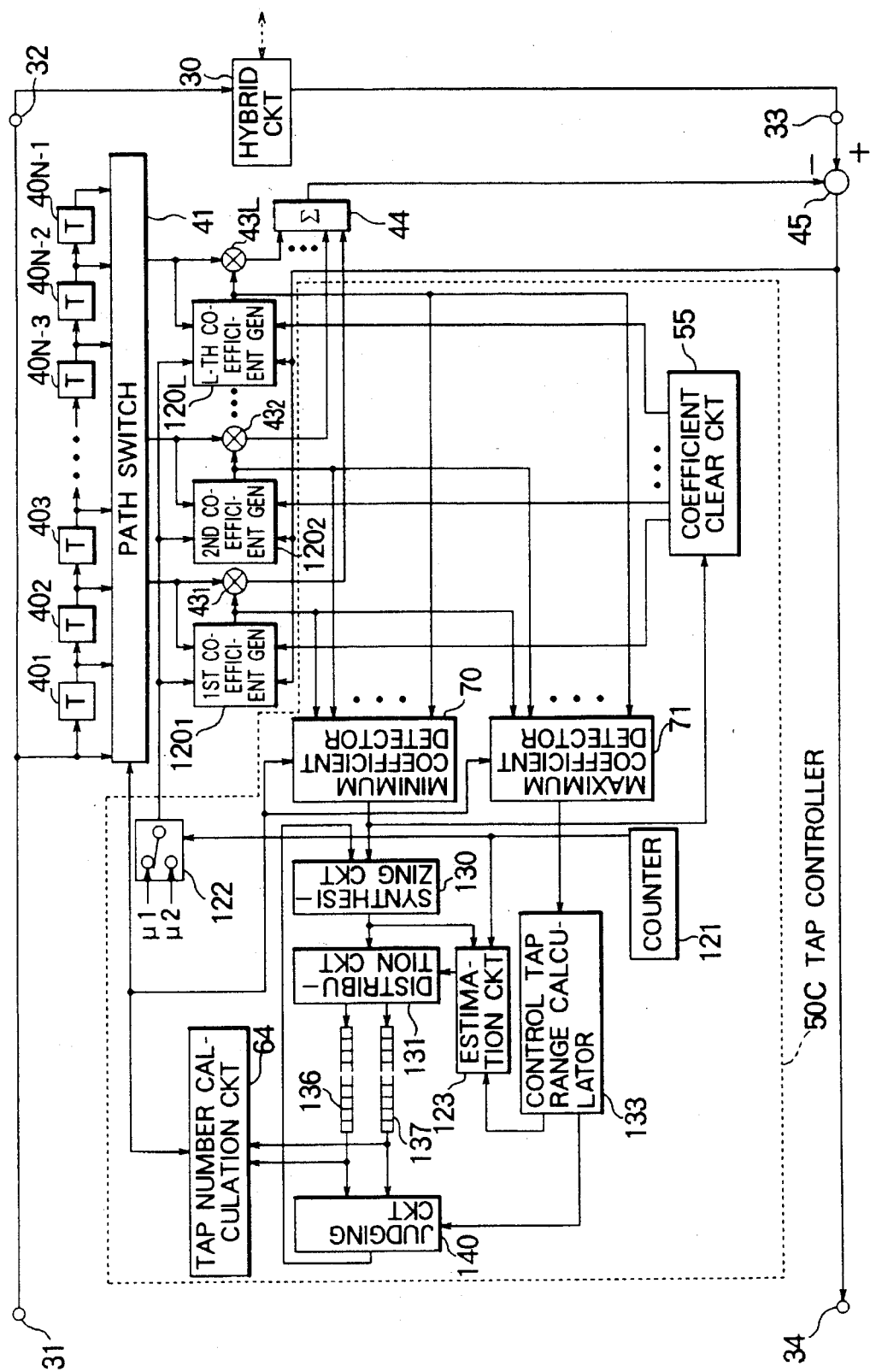
FIG. 9 is a similar block diagram of an adaptive filter according to a modification of the adaptive filter illustrated in FIG. 5.

Referring to FIG. 9, an adaptive filter 100 according to a third embodiment of this invention is used as the single adaptive filter included in the echo canceler mentioned above. From FIG. 9, it is apparent that the first and the second internal input terminals 111 and 112 and the first and the second internal output terminals 113 and 114 are removed from the tap controller 50C of the adaptive filter illustrated in FIG. 9. The remaining parts and elements are similar to those illustrated in FIG. 5 and are not therefore described any longer.

Figure 10:
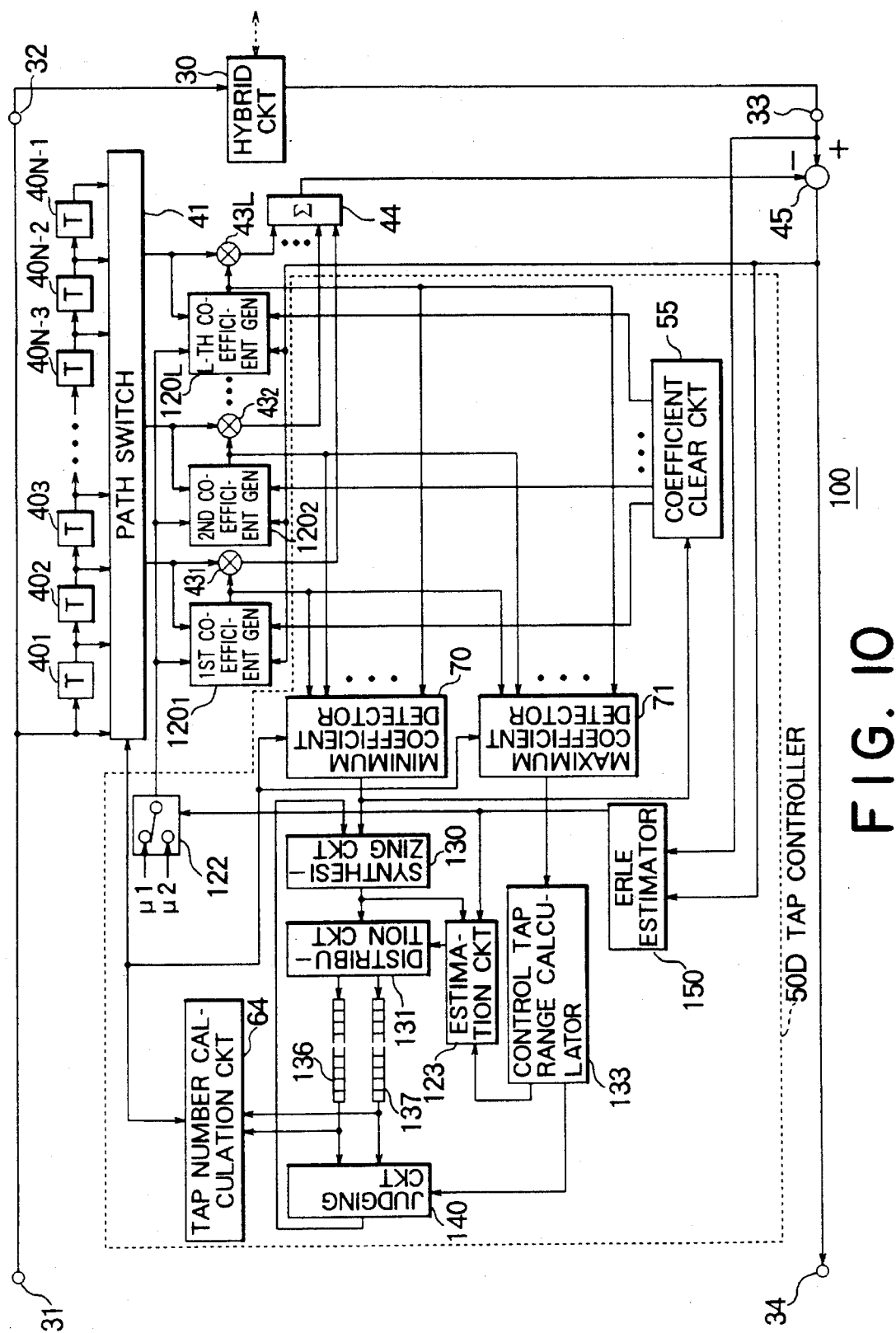
FIG. 10 is a block diagram of an adaptive filter according to another modification of the adaptive filter illustrated in FIG. 8.

Referring to FIG. 10, an adaptive filter 100 according to another modification of the adaptive filter illustrated in FIG. 8 also serves to form the single adaptive filter mentioned before and is similar in structure to that illustrated in FIG. 8 except that the tap controller 50D of the adaptive filter 100 of FIG. 10 comprises an ERLE estimator 150 which is not connected to the second internal input terminal 112 and that the first internal input terminal 111 and the first and the second internal input terminals 113 and 114 are eliminated from FIG. 10 like in FIG. 9. Therefore, description will not be made any longer as regards the adaptive filter 100 illustrated in FIG. 10.

THIRD EMBODIMENT

Figure 11:
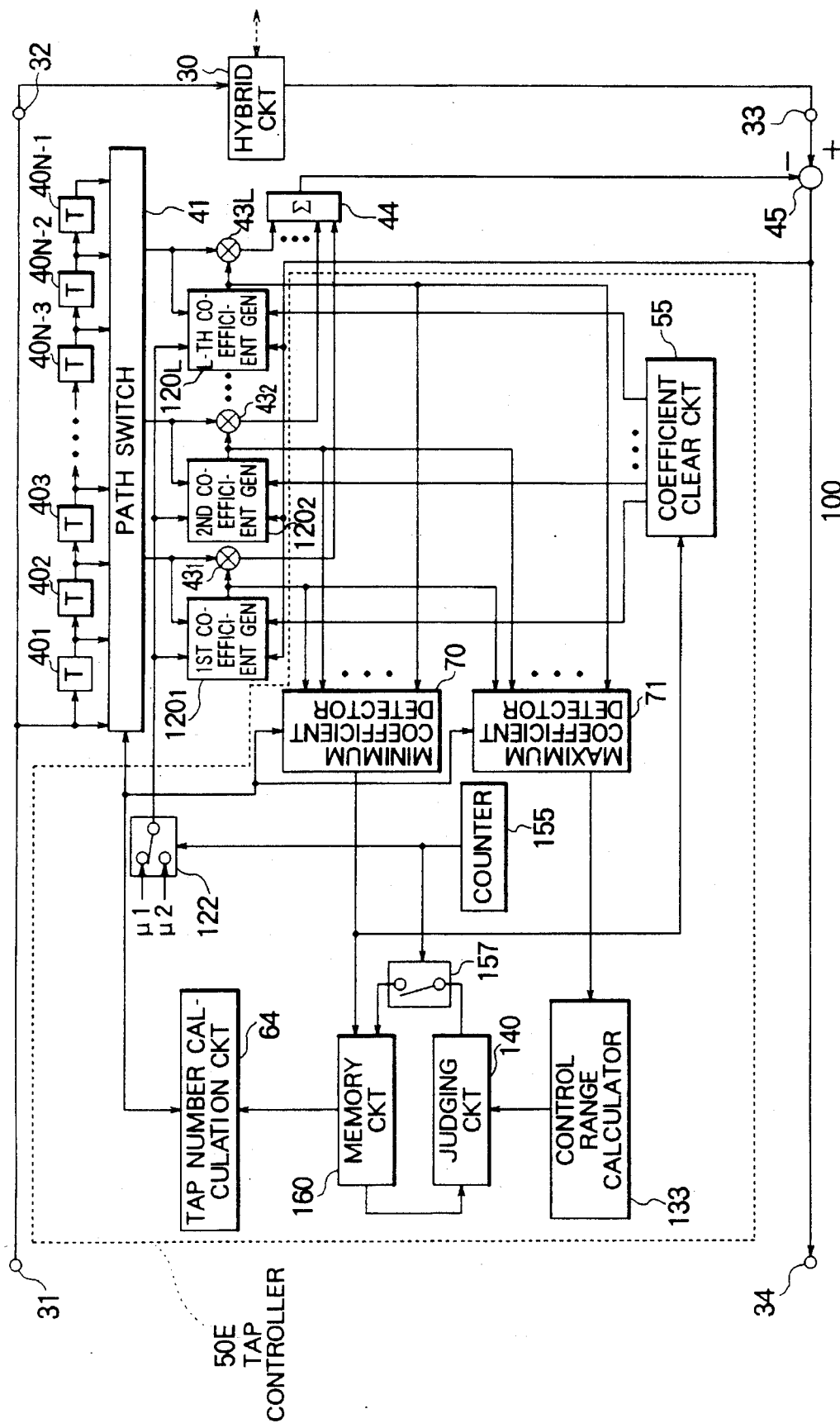
FIG. 11 is a block diagram of an adaptive filter according to a third embodiment of this invention.

Referring to FIG. 11, an adaptive filter 100 according to a third embodiment of this invention comprises similar parts and elements designated by like reference numerals. The adaptive filter 100 is used in the form of the single adaptive filter and is operable in accordance with algorithm mentioned in Document 3. Briefly, the illustrated adaptive filter 100 comprises a tap controller 50E and can remove disadvantages described in Document 3. In FIG. 11, a counter 155 counts modification times after the tap coefficients are modified and supplies a counter output signal to the step switch 122 and an additional switch 157 when the modification is carried out predetermined times. The additional switch 157 is located between a memory circuit 160 for memorizing inactive tap numbers and the judging circuit 140 connected to the control tap range calculation circuit 133. In the example being illustrated, the memory circuit 160 is directly connected to the minimum coefficient detector 70.

Before reception of the counter output signal, the step switch 122 selects the first step size ($\mu 1$) supplied to the first through the L-th coefficient generators $120_1$ to $120_L$. Under the circumstances, when the counter output signal is given from the counter 155, the step switch 122 selects the second step size ($\mu 2$) which is greater than the first step size ($\mu 1$), as mentioned before.

On the other hand, the additional switch 157 is put into an opened state before reception of the counter output signal and is put into a closed state in response to the counter output signal. In this closed state, an output signal, namely, a tap number of the judging circuit 140 is fed back to the memory circuit 160 through the additional switch 157 and is memorized in the memory circuit 160 as an inactive tap number.

Herein, the judging circuit 140 successively supplies the additional switch 157 with an inactive tap number which does not satisfy a judgement condition of $I_{max} \pm L$. This shows that a tap number which satisfies the judgement condition is discarded from the memory circuit 160 and becomes an active tap number. From this fact, it is understood that all inactive taps successively becomes active until the tap coefficients are completely modified the predetermined times from the beginning of the tap modification while only the tap numbers which satisfy the judgement condition of $I_{max} \pm L$ are selectively rendered into active taps. In addition, the small step size ($\mu 1$) is used to attain stable enhancement until the predetermined times of the modification are completed from the beginning of the modification. The maximum coefficient detector 71 which is connected to the step switch 122 determines $I_{max}$ in consideration of magnitudes of accurate tap coefficients obtained at a time instant at which the modification is completed the predetermined times. Thereafter, a usual step size, namely, the second step size is used to accomplish high speed convergence.

FOURTH EMBODIMENT

Figure 12:
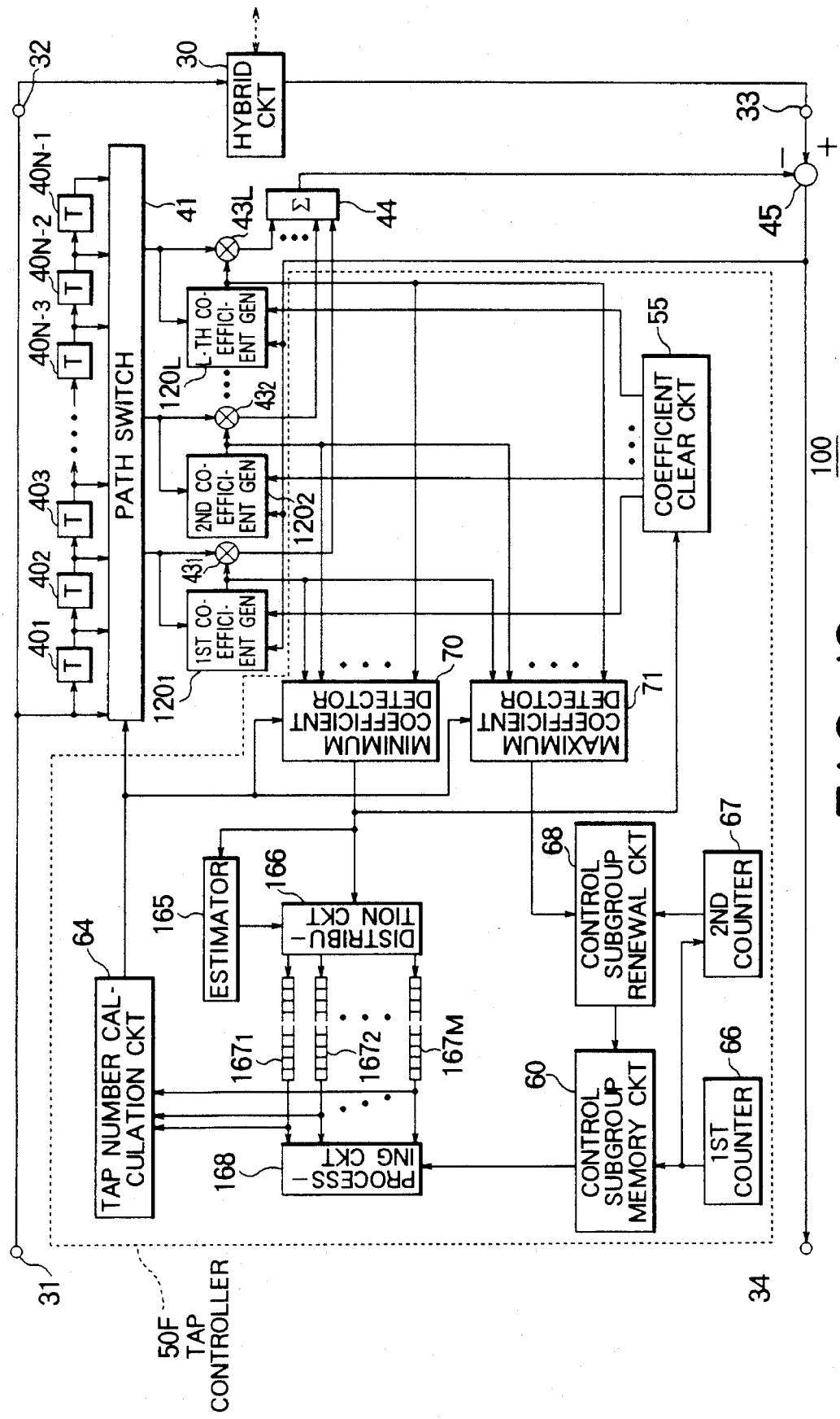
FIG. 12 is a block diagram of an adaptive filter according to a fourth embodiment of this invention.

Referring to FIG. 12, an adaptive filter 100 is applicable to an echo canceler according to a fourth embodiment of this invention and is similar in structure to the conventional adaptive filter illustrated in FIG. 1 except that an estimator 165, a distribution circuit 166, first through M-th memory circuits $167_1$ to $167_M$, and a processing circuit 168 are included in a tap controller 50F of the adaptive filter 100 shown in FIG. 12. The first through M-th memory circuits $167_1$ to $167_M$ correspond to the number of the subgroups, as mentioned in conjunction with FIG. 1, and are therefore located in one-to-one correspondence to first through M-th subgroups. The minimum coefficient detector 70 is connected to both the estimator 165 and the distribution circuit 166 and the distribution circuit 166 is controlled by the estimator 165 in a manner to be described later and is connected to the first through the M-th memory circuits $167_1$ to $167_M$ which are formed by first-in first-out memories and which are connected to the processing circuit 168 controlled by the control subgroup memory circuit 60.

With this structure, the estimator 165 is supplied from the minimum coefficient detector 70 with a tap number of a specific tap given a minimum absolute value and calculates a control subgroup number of the above-mentioned specific tap. Supplied with the control subgroup number of the specific tap, the distribution circuit 166 selects one of the first through the M-th memory circuits $167_1$ to $167_M$ as a selected memory circuit to send the tap number to the selected memory circuit. The processing circuit 168 is supplied from the control subgroup memory circuit 60 with a current control subgroup number currently selected and selects one of the first through the M-th memory circuits $167_1$ to $167_M$ that corresponds to the current control subgroup number. The processing circuit 168 extracts a tap number memorized in a top portion of the one memory circuit and discards the tap number.

In the illustrated example, the first through the M-th memory circuits $167_1$ to $167_M$ are connected to the tap calculation circuit 64. The tap calculation circuit 64 calculates active tap numbers by removing inactive tap numbers memorized in all of the memory circuits $167_1$ to $167_M$ and supplies the active tap numbers to the path switch 41 as a path switching control signal.

Thus, all of the tap numbers extracted from the memory circuits $167_1$ to $167_M$ are all active tap numbers and include no inactive tap numbers. Therefore, it is possible to save useless operation which might be carried out in the conventional adaptive filter illustrated in FIG. 1.

Figure 13:
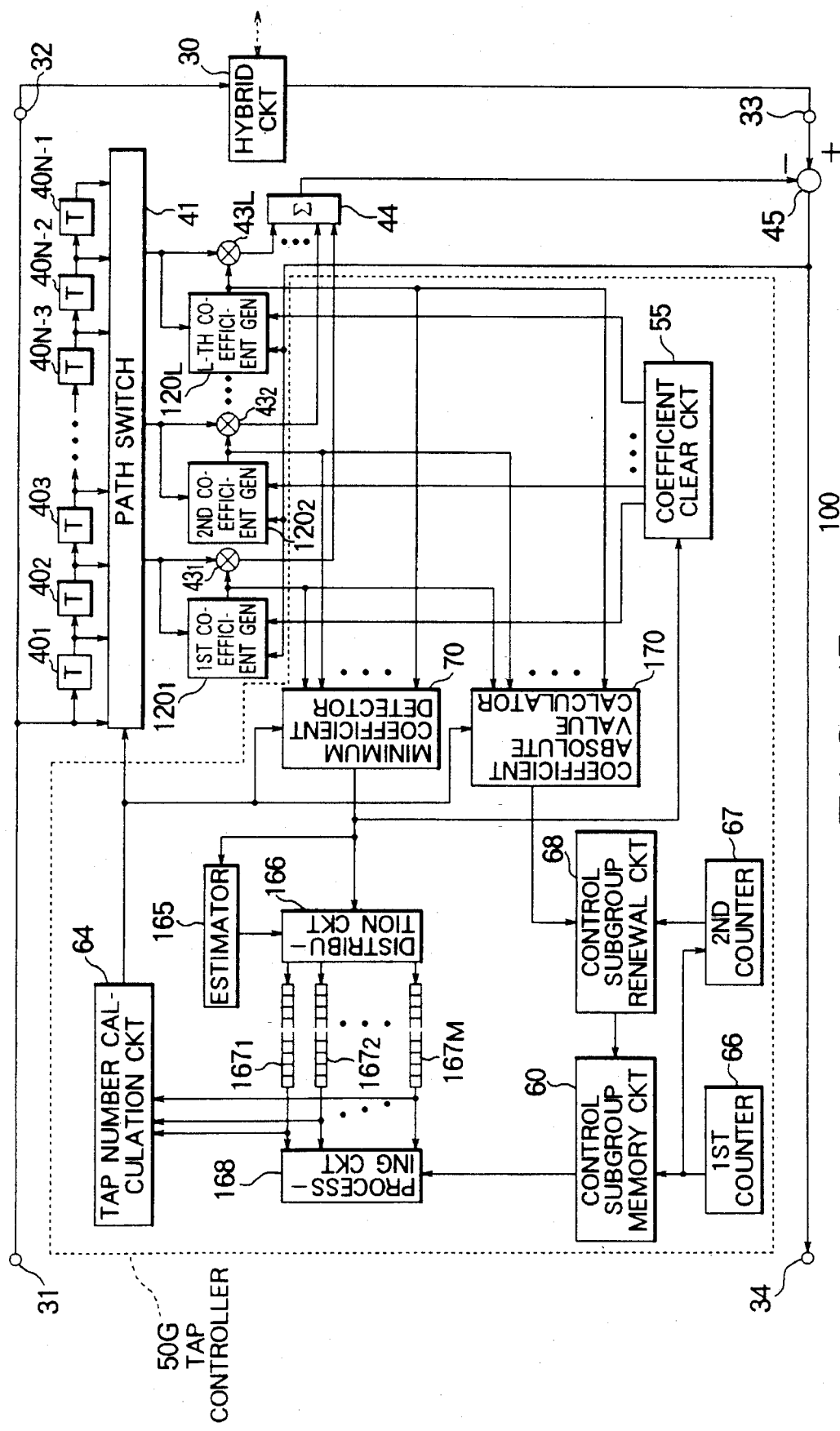
FIG. 13 is a block diagram of an adaptive filter according to a modification of the adaptive filter illustrated in FIG. 12.

Referring to FIG. 13, an adaptive filter according to a modification of the adaptive filter of FIG. 12 is similar in structure to that illustrated in FIG. 12 except that a tap controller 50G comprises a coefficient absolute value calculator 170 substituted for the maximum coefficient detector 71 which is shown in FIG. 12 and which determines the order of the tap control subgroup number to be produced, in response to a maximum absolute value of tap coefficients included in each tap control subgroup. On the other hand, the coefficient absolute value calculator 170 determines the order of the tap control subgroup numbers by the use of a total sum of the absolute values of tap coefficients included in each of the tap control subgroups. Specifically, the coefficient absolute value calculator 170 is supplied with each tap coefficient and active tap numbers produced by the tap number calculation circuit 64. The coefficient absolute value calculator 170 calculates the total sum of the absolute values of the tap coefficients included in each tap control subgroup and successively produces the tap control subgroup numbers from a greater one of the total sums to a smaller one in order.

Figure 14:
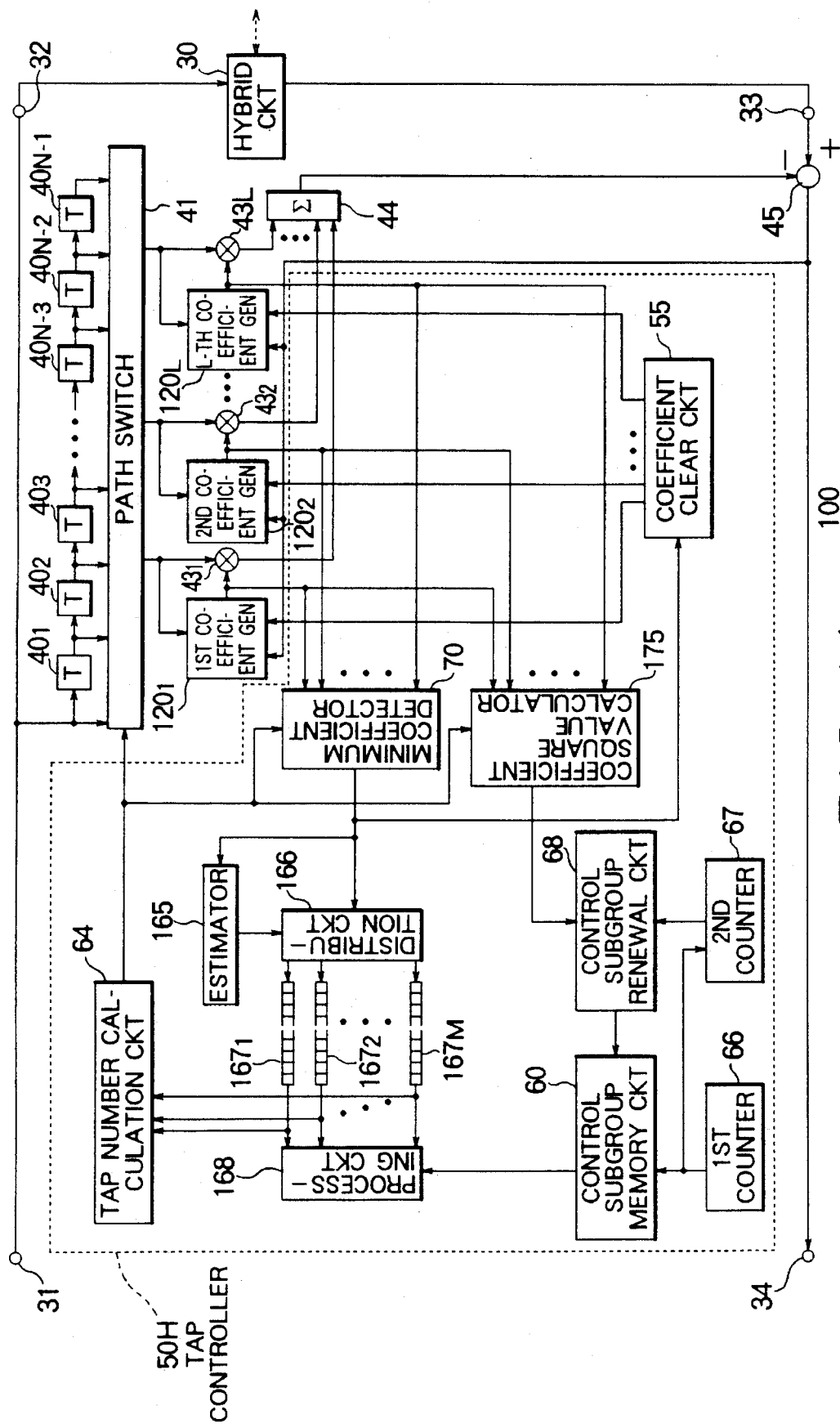
FIG. 14 is a block diagram of an adaptive filter according to a further modification of the adaptive filter illustrated in FIG. 13.

Referring to FIG. 14, an adaptive filter according to a modification of the adaptive filter of FIG. 13 is similar in structure to that illustrated in FIG. 13 except that a tap controller 50H comprises a coefficient square value calculator 175 substituted for the coefficient absolute value calculator 170. The coefficient square value calculator 175 calculates a total sum of square values of tap coefficients included in each tap control subgroup and determines an order of the tap control subgroup numbers to be produced. To this end, the coefficient square value calculator 175 calculates the total sum of the square values of the tap coefficients in each tap control subgroup in response to each tap coefficient and active tap numbers sent from the tap number calculator 64 and successively produces the tap control subgroup numbers from a greater one of the total sums in order.

In the example illustrated in FIGS. 12 through 14, the maximum absolute value of each tap control subgroup, the total sum of the coefficient absolute value of each tap control subgroup, and the total sum of the coefficient square value of each tap control subgroup are used as control subgroup information. However, any other coefficient information may be used instead of the above-exemplified coefficient information.

Although a single tap coefficient is assumed to be modified within a single tap control operation in the above-mentioned embodiments, two or more tap coefficients may be modified within a single tap control operation.

Figure 15:
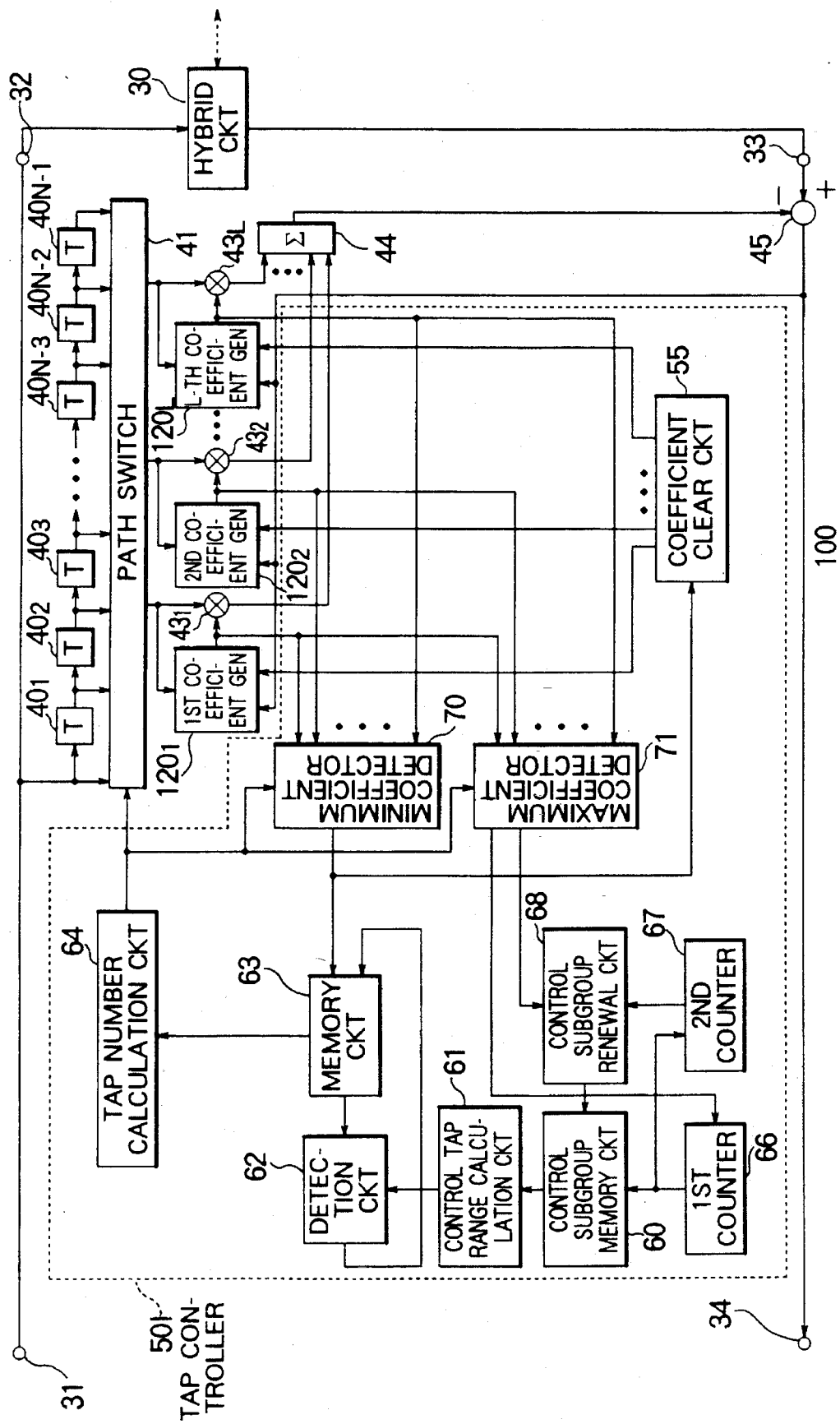
FIG. 15 is a block diagram of an adaptive filter according to another modification of the adaptive filter illustrated in FIG. 14.

Referring to FIG. 15, an adaptive filter according to another modification of the adaptive filter of FIG. 14 is similar in structure to that illustrated in FIG. 1 except that a tap controller 50I comprises the maximum coefficient detector 71 connected to the first counter 61. Therefore, description will be directed to operation of the maximum coefficient detector 71 and the first counter 61 hereinunder.

Supplied with each tap coefficient and the active tap numbers sent from the tap calculation circuit 64, the maximum coefficient detector 71 detects, at every tap control subgroup, a specific tap coefficient which has a maximum absolute value and delivers the maximum absolute value to the first counter 61. In addition, the maximum coefficient detector 71 rearranges the tap control subgroup numbers in the order of magnitudes of the maximum absolute values and sends the rearranged tap control subgroup numbers to the control subgroup renewal circuit 68.

In this event, the maximum absolute values in the control tap subgroups are variable, as suggested before, and are concerned with modification times. In other words, the modification times are changed from one to another in accordance with the magnitudes of the maximum absolute values. For example, the modification times become large with an increase of the maximum absolute values. In other words, a large number is given as the modification times and is set into the first counter 61 when the maximum absolute values are large.

With this structure, the first counter 61 is given the modification times which correspond to the magnitudes of the maximum absolute values and which may be called predetermined values. The first counter 61 counts the modification times to the predetermined values determined by the magnitudes of the maximum absolute values. Therefore, the first counter 61 produces a control subgroup change signal at a long time interval as the maximum absolute value becomes large in the control subgroups.

Figure 16:
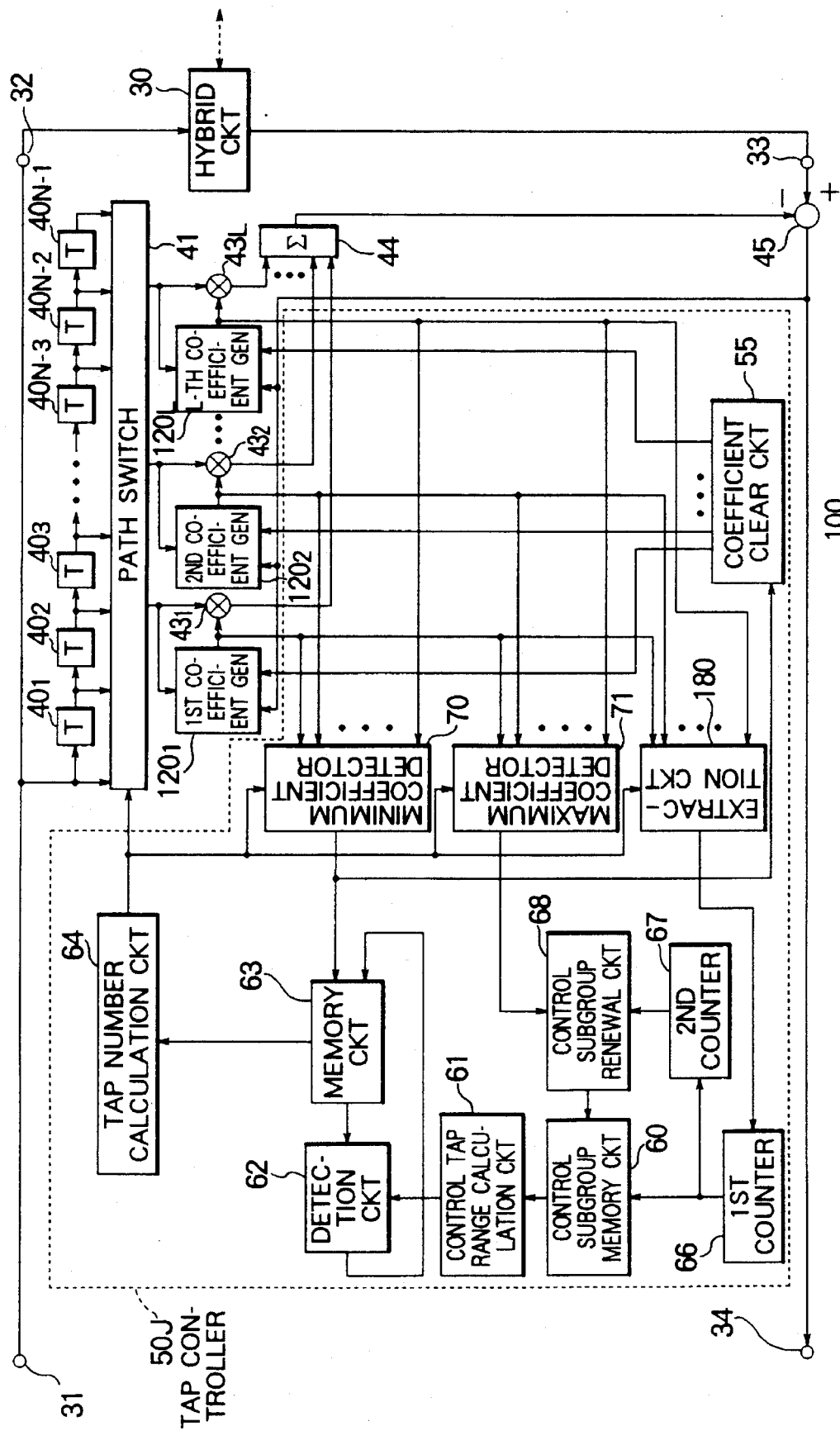
FIG. 16 is a block diagram of an adaptive filter according to still another modification of the adaptive filter illustrated in FIG. 15.

Referring to FIG. 16, another adaptive filter according to a modification of this invention is similar in structure except that a control subgroup coefficient information extraction circuit (abbreviated to extraction circuit) 180 is connected in a tap controller 50J to the coefficient generators $42_1$ to $42_L$, the tap calculation circuit 64, and to the first counter 61. The extraction circuit 180 is given each tap coefficient and active tap numbers sent from the tap calculation circuit 64, to calculate a total sum of absolute values of tap coefficients at each of the tap control subgroups and to supply the total sum and the corresponding tap control subgroup number to the first counter 61. The total sums in the control tap subgroups are made to correspond to modification times of the tap coefficients, namely, predetermined numbers representative of the modification times. Accordingly, each of the predetermined numbers is set into the first counter 61 which counts the modification times. Each time when the first counter 61 counts the modification times to the predetermined numbers, the first counter 61 supplies the control subgroup memory circuit 60 and the second counter 62 with the control subgroup change signal. This shows that the control subgroup change signal appears at a long time interval as the total sum becomes large in each of the control subgroups.

Figure 17:
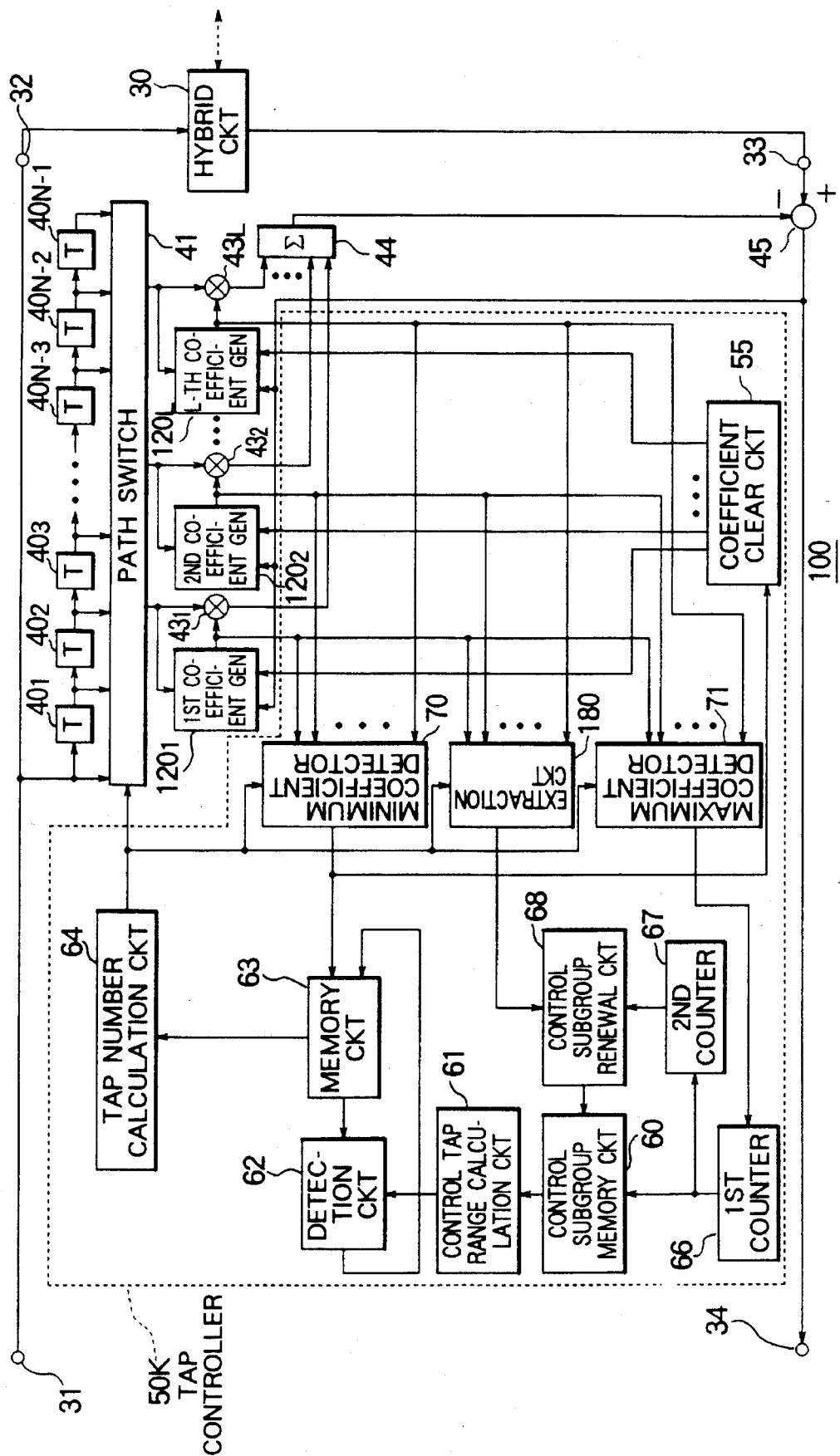
FIG. 17 is a block diagram of an adaptive filter according to yet another modification of the adaptive filter illustrated in FIG. 16.

Referring to FIG. 17, an adaptive filter according to still another modification of this invention comprises similar parts designated by like reference numerals. In FIG. 17, the control subgroup coefficient information extraction circuit (abbreviated to extraction circuit) 180 is connected in a tap controller 50K to the control subgroup renewal circuit 68 while the maximum coefficient detector 71 is connected to the first counter 71. Like in FIG. 16, the extraction circuit 180 is supplied with each tap coefficient and the active tap number sent from the tap calculation circuit 64 to calculate a total sum of absolute values of tap coefficients at each tap control subgroup, to rearrange the total sums in the order of the magnitudes as rearranged total sums, and to obtain rearranged tap control subgroup numbers corresponding to the rearranged total sums. The rearranged tap control subgroup numbers are supplied to the control subgroup renewal circuit 68.

On the other hand, the maximum coefficient detector 71 detects, at every tap control subgroup, a specific tap coefficient which exhibits a maximum absolute value and attains the corresponding tap control subgroup number. The absolute value of the specific tap coefficient and the tap control subgroup number are supplied to the first counter 61.

The first counter 61 counts the modification times and produces a control signal each time when the modification times reach times defined by each absolute value sent from the maximum coefficient detector 71. The control signal serves to change the control subgroups from one to another and is delivered to the control subgroup memory circuit 60 and the second counter 62.

With this structure, a long time interval lapses until production of the control signal in the control subgroups to which large absolute values are assigned.

In the adaptive filters illustrated in FIGS. 15 to 17, a tap position control operation is carried out such that a time interval for changing a modification or a specific subgroup from one of the subgroups to a next subgroup is determined in consideration of a degree of significance of each subgroup. This shows that a subgroup becomes the specific subgroup for a long time as the degree of significance is higher. Therefore, tap coefficients are preferentially assigned to the dispersive portion, which enables high speed convergence.

Although the total sums of the absolute values and the total sums of the square values are used as coefficient information in FIGS. 16 and 17, any other coefficient information may be used.

FIFTH EMBODIMENT

Figure 18:
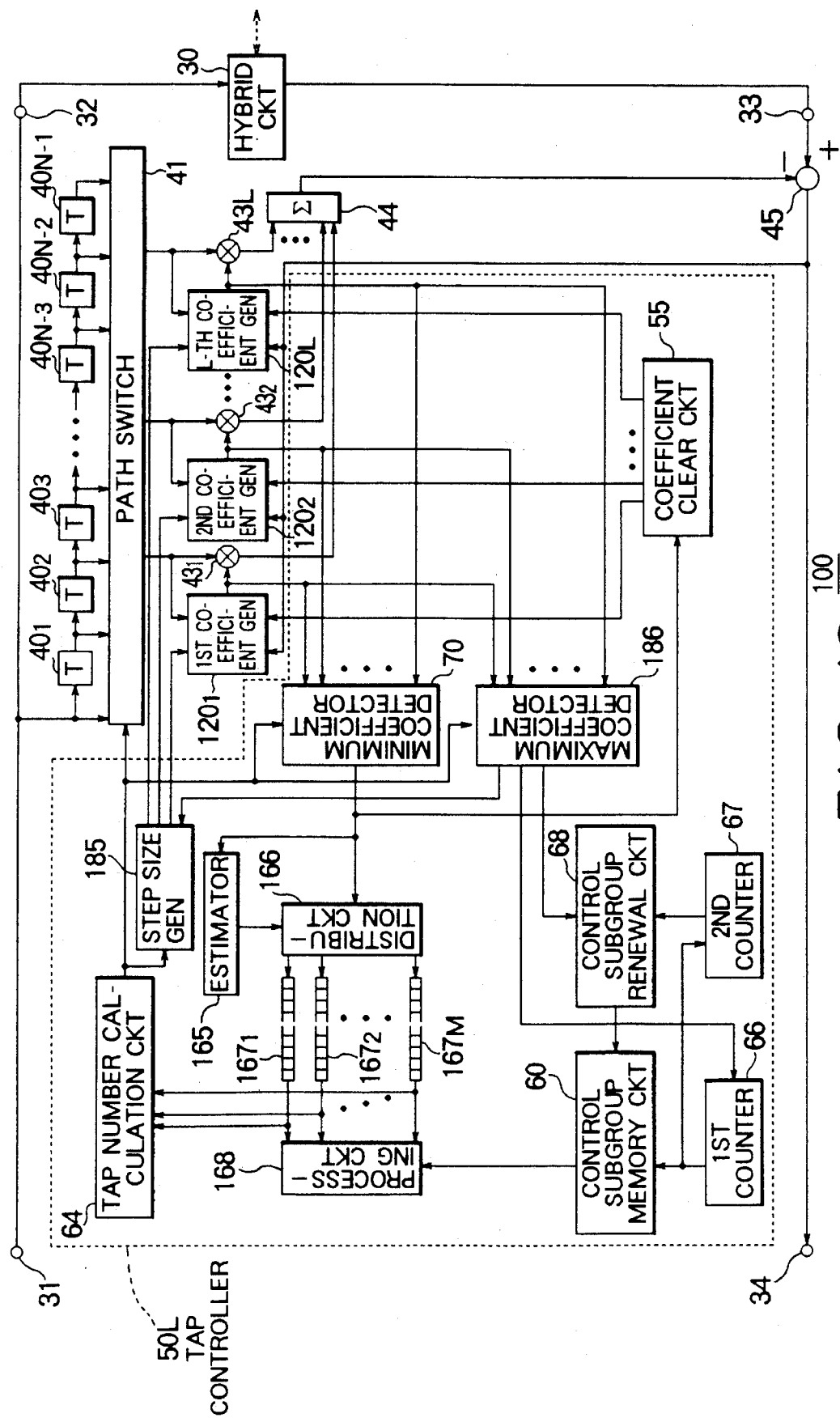
FIG. 18 is a block diagram of an adaptive filter according to a fifth embodiment of this invention.

Referring to FIG. 18, an adaptive filter according to a fifth embodiment of this invention is similar to that illustrated in FIG. 12. Specifically, a tap controller 50L of the adaptive filter of FIG. 18 comprises an estimator 165, a distribution circuit 166, first through M-th memory circuits $167_1$ to $167_M$, and a processing circuit 168 like in FIG. 12. However, it is to be noted that the adaptive filter illustrated in FIG. 18 further comprises a step size generator 185 for varying a step size from one to another like in FIG. 5. In this connection, first through L-th coefficient generators may be similar in structure to those illustrated in FIG. 6 and are therefore depicted at $120_1$ to $120_L$ in FIG. 18. In addition, a maximum coefficient detector 186 is somewhat different in structure from that illustrated in the other figures, as will become clear later, and is connected to the first counter 66 and the control subgroup renewal circuit 68.

In FIG. 18, the estimator 165 is supplied with a tap number of a tap which has a minimum absolute value of a tap coefficient and calculates a control subgroup number of a subgroup to which the tap in question belongs. The control subgroup number is sent from the estimator 165 to the distribution circuit 166. The distribution circuit 166 selects one of the first through the M-th memory circuits corresponding to the control subgroup number and delivers the tap number to the selected memory circuit. The first through the M-th memory circuits $167_1$ to $167_M$ are in one-to-one correspondence to the subgroups and structured by first-in first-out memories. At any rate, the tap number is memorized in the selected memory circuit through the distribution circuit 166.

On the other hand, the processing circuit 168 which is connected to the first through the M-th memory circuits $167_1$ to $167_M$ is also connected to the control subgroup memory circuit 60. The processing circuit 168 is supplied from the control subgroup memory circuit 60 with a current control subgroup number currently selected and selects a currently selected memory circuit in response to the current control subgroup number to extract a leading one of the tap numbers memorized in a top or leading portion of the currently selected memory circuit. Thereafter, the leading tap number is discarded by the processing circuit 168.

The tap number calculation circuit 64 is given inactive tap numbers from the first through the M-th memory circuits $167_1$ to $167_M$ to calculate active tap numbers by removing the inactive tap numbers memorized in the first through the M-th memory circuits $167_1$ to $167_M$. Thus, the calculated active tap numbers are delivered from the tap number calculation circuit 64 to the path switch 41 as a tap switching control signal.

In the illustrated example, the maximum coefficient detector 186 is supplied from the first through the L-th coefficient generators $120_1$ to $120_L$ with tap coefficients and from the tap number calculation circuit 64 with active tap numbers of the corresponding coefficient generators. Under the circumstances, the maximum coefficient detector 186 calculates each absolute value of the tap coefficients and detects a maximum value $C_{max}$ of the absolute values.

Subsequently, a ratio between the maximum value $C_{max}$ and a maximum absolute coefficient value in each control subgroup is calculated by the maximum coefficient detector 186. For example, when the control subgroups are equal in number to M, it is assumed that the maximum absolute coefficient value in each control subgroup is represented by $c_{j,max}$ where j is not smaller than unity and is not greater than M. In this case, the ratio $R_j$ is given by:

$$R_j = c_{j,max}/C_{max}$$

and is sent to the step size generator 185.

Furthermore, the illustrated maximum coefficient detector 186 rearranges $c_{j,max}$ from a greater one to rearrange the tap control subgroup numbers j of subgroup numbers in the order of a greater $c_{j,max}$. The rearranged tap control subgroup numbers are transmitted to the control subgroup renewal circuit 68. In addition, the maximum coefficient detector 186 supplies the first counter 61 with a predetermined count assigned to each of the rearranged tap control subgroup numbers j.

In the meanwhile, the step size generator 185 generates a step size ($\mu_i$) in response to the ratio $R_j$ supplied from the maximum coefficient detector 186 and transmits the step size ($\mu_i$) to a corresponding coefficient generator $120_i$. Specifically, the step size ($\mu_i$) is calculated by multiplying $R_j$ by a predetermined constant ($\mu$) and is therefore given by ($\mu_i$)=($\mu$)×$R_j$, where i is not smaller than unity and is not greater than L. This shows that the step size ($\mu_i$) which is used to renew or modify tap coefficients of a j-th control subgroup is calculated in response to the path switching control signal sent from the tap number calculation circuit 64. In other words, the coefficient generators $120_i$ of the j-th control subgroup are supplied with the step size ($\mu_j$).

Each of the coefficient generators $120_i$ is similar in structure to that illustrated in FIG. 6 and will therefore not described any longer.

In any event, the tap numbers which are derived from the first through the M-th memory circuits $167_1$ to $167_M$ are all used as active tap numbers at a probability of 100%. Moreover, selection is made for a longest time about one of the first through the M-th memory circuits that corresponds to a tap control subgroup having a highest degree of significance. In addition, the one of the memory circuits is initially selected in the order of selection. Accordingly, tap coefficients are allocated to correct taps for a short time. As a result, a convergence time can be shortened.

Inasmuch as the step size is variable in consideration of a degree of significance of the tap control subgroups to which each tap belongs. This brings about shortening the convergence time.

Figure 19:
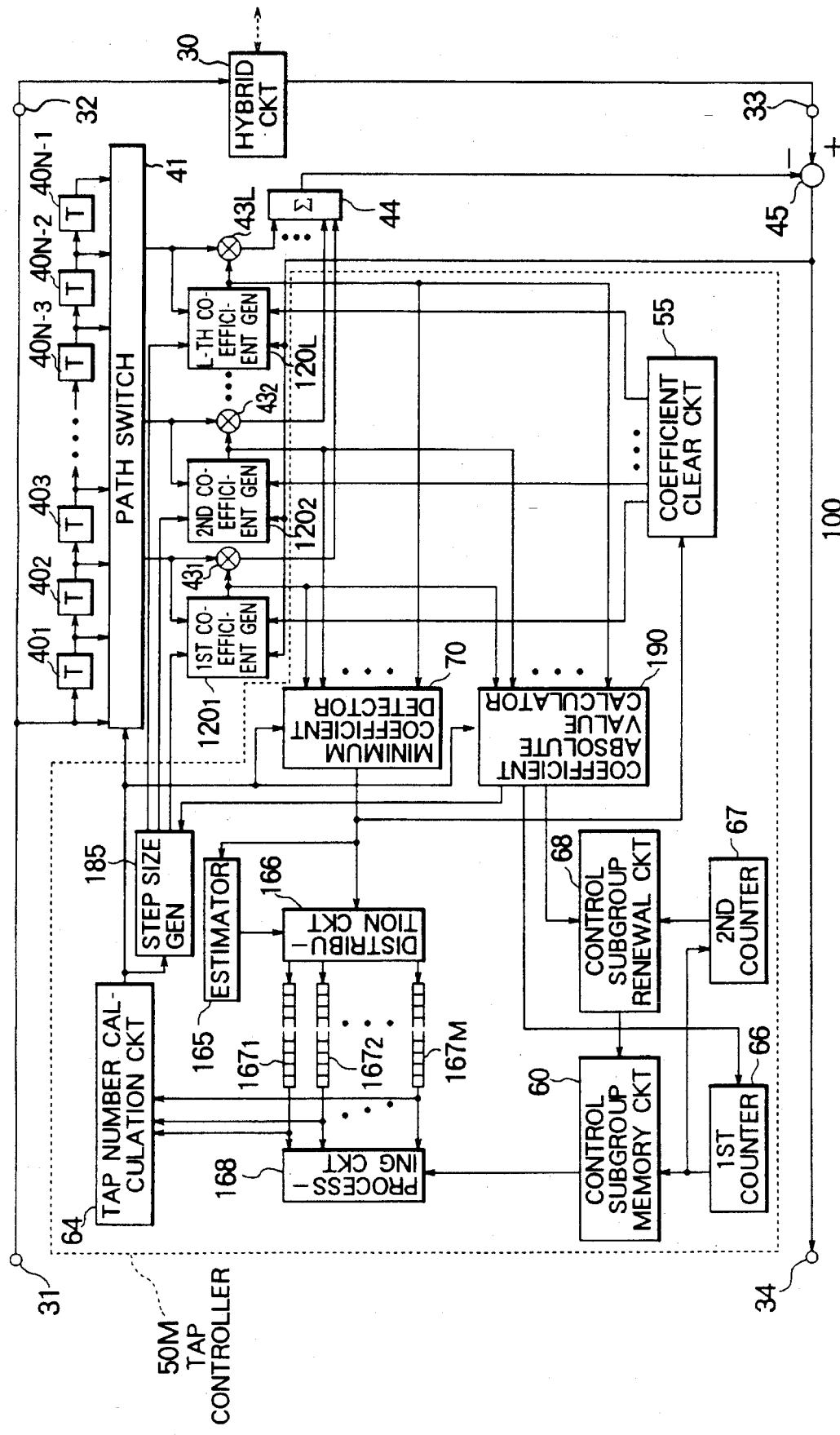
FIG. 19 is a block diagram of an adaptive filter according to a modification of the adaptive filter illustrated in FIG. 18.

Referring to FIG. 19, an adaptive filter according to a modification of the adaptive filter illustrated in FIG. 18 is similar in structure to that illustrated in FIG. 18 except that a coefficient absolute value calculator 190 is substituted in a tap controller 50M for the maximum coefficient detector 186. The illustrated coefficient absolute value calculator 190 determines the order of the tap control subgroup numbers, the counts of the first counter 66, and the step size by the use of a total sum of absolute values of tap coefficients in each tap control subgroup. Specifically, the coefficient absolute value calculator 190 is supplied with tap coefficients and active tap numbers from the respective coefficient generators and the tap number calculation circuit 64 to calculate the total sum of the absolute values of the tap coefficients in each control tap subgroup and rearranges the tap control subgroup numbers j in the order of a greater one of the total sums.

In addition, the coefficient absolute value calculator 190 further determines a maximum value in the calculated total sums and calculates a ratio R of each total sum to the maximum value. Specifically, let the tap control subgroups be equal in number to M. In addition, it is assumed that each total sum in the tap control subgroups is given by $s_{j,max}$ where j is not smaller than unity and is not greater than M and that the maximum value of $s_{j,max}$ is given by $S_{max}$. Under the circumstances, the ratio $R_j$ of a j-th tap control subgroup is given by $R_j = s_{j,max}/S_{max}$ and is delivered to the step size generator 185.

Furthermore, the illustrated coefficient absolute value calculator 190 rearranges the tap control subgroup numbers j in the order of a greater one of the total sums $s_{j,max}$ and transmits the rearranged tap control subgroup numbers to the control subgroup renewal circuit 68. In addition, the coefficient absolute value calculator 190 supplies the first counter 66 with the counts corresponding to the rearranged tap control subgroup numbers j.

Figure 20:
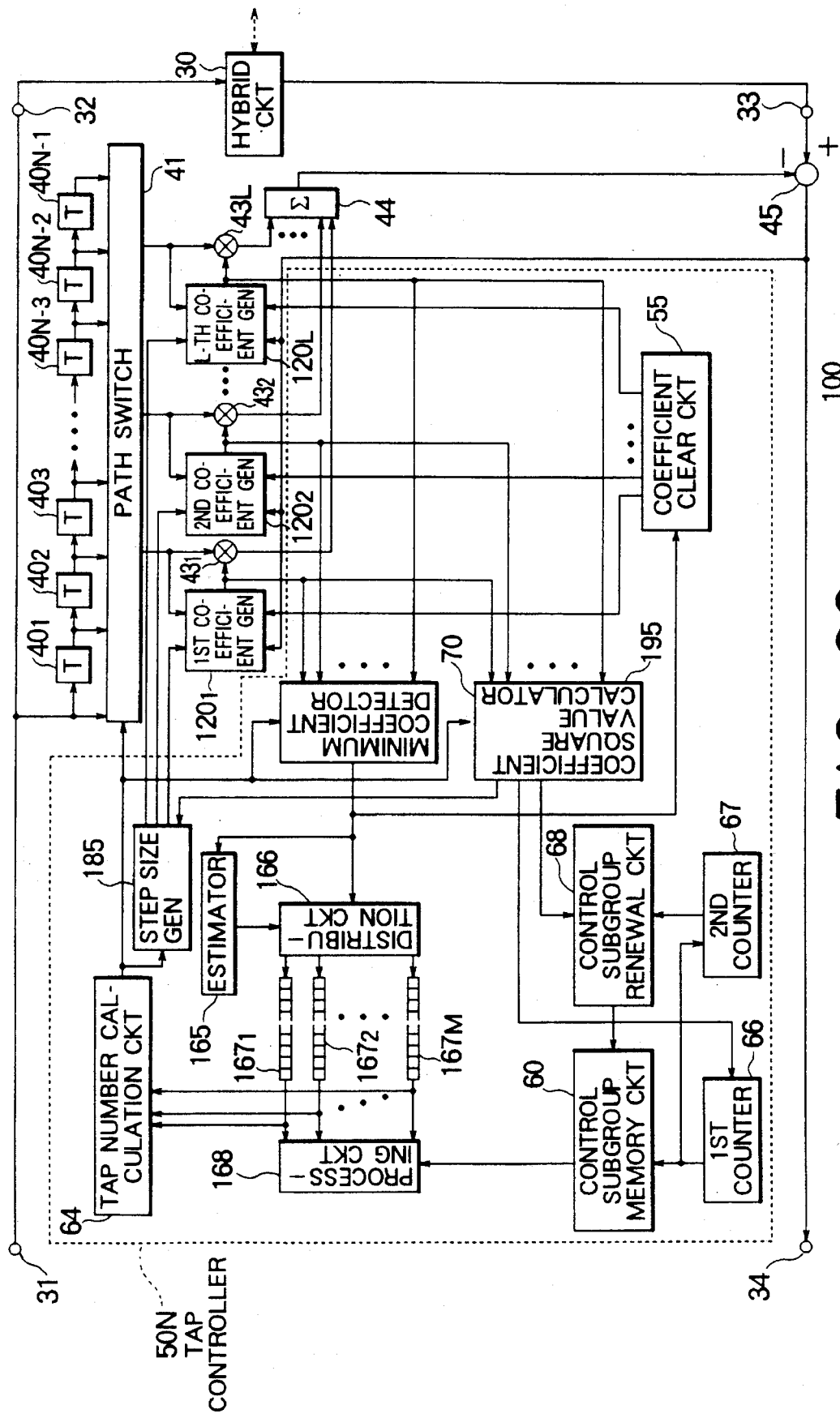
FIG. 20 is a block diagram of an adaptive filter according to another modification of the adaptive filter illustrated in FIG. 18.

Referring to FIG. 20, an adaptive filter according to still another modification of the adaptive filter illustrated in FIG. 18 is similar in structure to that illustrated in FIG. 19 except that a coefficient square value calculator 195 is substituted in a tap controller 50N for the coefficient absolute value calculator 190. The coefficient square value calculator 195 determines the order of the tap control subgroup numbers, the counts of the first counter 66, and the step size by the use of a total sum of the coefficient square values in each of the tap control subgroups.

Supplied with the tap coefficients and the active tap numbers from the first through the L-th coefficient generators $120_1$ to $120_L$ and the tap number calculation circuit 64, the coefficient square value calculator 195 calculates the total sum of the coefficient square values in each tap control subgroup and rearranges the tap control subgroup numbers j in the order of a greater one of the total sums. A maximum value is also determined in the calculated total sums by the coefficient square value calculator 195. A ratio of each total sum to the maximum value is further calculated by the coefficient square value calculator 195. For example, the ratio $R_j$ of a j-th tap control subgroup is given by $u_{j,max}/U_{max}$ where $u_{j,max}$ is representative of the total sum of the square values of the tap coefficients in each tap control subgroup and Umax, a maximum value of the total values. If the tap control subgroups are equal in number to M, j is not smaller than unity and is not greater than M.

At any rate, the ratio $R_j$ is sent to the step size generator 185 like in FIGS. 18 and 19. In addition, the coefficient square value calculator 195 rearranges the tap control subgroup numbers j in the order of a greater one of $u_{j,max}$ to transmit the rearranged tap control subgroup numbers j to the control subgroup renewal circuit 68 and supplies the first counter 66 with the counts corresponding to the rearranged tap control subgroup numbers j.

Any other coefficient information can be used as control subgroup coefficient information except for the maximum absolute values, the total sums of the coefficient absolute values, and the total sums of the coefficient square values.

While this invention has thus far been described in conjunction with several embodiments thereof, it will be possible for those skilled in the art to put this invention into practice in various other manners. For example, this invention is applicable to a noise canceler, a howling canceler, an adaptive equalizer, and the like. In addition, the tap coefficient algrorithm may not be restricted to the LMS algorithm but may be any other algrorithms than the LMS algorithm.

What is claimed is:

1. A method of identifying an unknown system by the use of an adaptive filter having a plurality of taps assigned with consecutive tap numbers divided into a plurality of groups, said adaptive filter being supplied with a transmission input signal and a reception input signal which is sent through said unknown system and which exhibits an impulse response resulting from said unknown system, said impulse response being specified by a plurality of dispersive portions and a plurality of flat delay portions, the method comprising the steps of:

preparing first through K-th subadaptive filters which is obtained by dividing said adaptive filter and each of which has the taps having group tap numbers of each group; and successively identifying at least one of the dispersive and the flat delay portions in said impulse response by successively controlling each of the first through the K-th subadaptive filters.

2. A method as claimed in claim 1, wherein said identifying step comprises the steps of:

selecting active ones of the taps in each group to determine active and inactive ones of the group tap numbers in each group;

calculating tap coefficients only in connection with the active taps of each group;

memorizing the active ones of the group tap numbers in each group with the inactive ones of the group tap numbers memorized in the form of a queue in each group;

modifying the tap coefficients in connection with the active taps of each group to predetermined times;

detecting a minimum absolute value of the tap coefficients in connection with the active taps of each group each time when the tap coefficients are modified the predetermined times, so as to render the tap of said minimum absolute value into an inactive tap having a new inactive tap number; and successively substituting a new one of the active tap numbers for the new inactive tap number to change the active tap numbers from one to another and to adaptively control positions of the active taps in each of the subadaptive filters so that at least one of the dispersive and the flat delay portions is identified in each of the subadaptive filters.

3. A method as claimed in claim 2, wherein said modifying step comprises the steps of:

modifying the tap coefficients of the active taps in each group by the use of a first step size until the tap coefficients are modified a first predetermined time; and thereafter modifying the tap coefficients of the active taps in each group by the use of a second step size greater than said first step size a second predetermined time, said predetermined times being equal to a sum of said first and said second predetermined times.

4. A method as claimed in claim 1, wherein the identifying step comprises the steps of:

detecting a maximum absolute value of the tap coefficients of the active taps in each group to obtain a specific tap number corresponding to the maximum absolute value; and transmitting said specific tap number from an i-th one of the subadaptive filters to an (i+1)-th one of the subadaptive filters where i is not smaller than unity and is not greater than K−1.

5. A method as claimed in claim 4, wherein the identifying step further comprises the steps of:

detecting a minimum absolute value of the tap coefficients in connection with the active taps of each group each time when the tap coefficients are modified the predetermined times, so as to render the tap of said minimum absolute value into an inactive tap having a new inactive tap number;

modifying the tap coefficients in connection with the active taps of each group to predetermined times with reference to the specific tap number and the new inactive tap number; and successively substituting a new one of the active tap numbers for the new inactive tap number to change the active tap numbers from one to another and to adaptively control positions of the active taps in each of the subadaptive filters so that at least one of the dispersive and the flat delay portions is identified in each of the subadaptive filters.

6. A method of identifying an unknown system by the use of an adaptive filter having a plurality of taps assigned with consecutive tap numbers, said adaptive filter being supplied with a transmission input signal and a reception input signal which is sent through said unknown system and which exhibits an impulse response resulting from said unknown system, said impulse response being specified by a plurality of dispersive portions and a plurality of flat delay portions, the method comprising the steps of:

modifying tap coefficients of the taps by the use of a first step size until said tap coefficients are modified to obtain primary modified tap coefficients;

thereafter modifying the primary modified tap coefficients by the use of a second step size greater than said first step size to obtain secondary modified tap coefficients; and successively identifying at least one of the dispersive and the flat delay portions in said impulse response by using the primary and the secondary modified tap coefficients.

7. A method as claimed in claim 6, further comprising the steps of:

counting modification times of the primary modified tap coefficients as count values to a predetermined count; and switching the step sizes from the first step size to the second step size when said count values become equal to said predetermined count.

8. A method as claimed in claim 6, further comprising the steps of:

monitoring an echo return loss enhancement (ERLE) calculated in connection with said impulse response;

comparing said echo return loss enhancement with a preselected threshold level when the echo return loss enhancement reaches the preselected threshold level; and switching the step sizes from the first step size to the second step size when the echo return loss enhancement reaches the preselected threshold level.

9. An identification apparatus for use in identifying an unknown system by responding to a transmission input signal and a reception input signal which is sent through said unknown system and which includes an impulse response of an echo signal specified by a plurality of dispersive portions and a plurality of flat delay portions, said identification apparatus comprising:

first through K-th adaptive filters which are supplied with said transmission input signal in parallel and a feedback signal and each of which identifies at least one of the dispersive portions to produce first through K-th identification signals representative of results of identification in the first through the K-th adaptive filters;

an adder circuit supplied with said first through said K-th identification signals for summing up said first through said K-th identification signals to produce an echo replica signal representative of a replica of said echo signal;

a subtracter for subtracting said echo replica signal from said echo signal to produce an error signal; and means for supplying said first through said K-th adaptive filters with said error signal as said feedback signal.

10. An identification apparatus as claimed in claim 9, wherein each of said first through said K-th adaptive filters comprises:

a delay circuit, which defines a first predetermined number of taps and which is supplied with said transmission input signal, for successively delaying said transmission input signal to produce successively delayed signals through the taps, respectively, said taps being assigned with consecutive tap numbers of a group;

a path switch supplied with a path switching control signal and connected to said taps for selecting the taps of a second predetermined number smaller than said first predetermined number to selectively produce the successively delayed signals of the second predetermined number;

coefficient calculation means of the second predetermined number connected to said path switch and supplied with the second predetermined number of the successively delayed signals and said error signal for calculating tap coefficients of the second predetermined number;

production means connected to said path switch and said coefficient calculation means for producing each of the first through the K-th identification signals; and a tap controller connected to said path switch and said coefficient calculation means for supplying said path switch and said coefficient calculation means with a path switch control signal and a coefficient control signal to make said path switch switch the taps from one to another in response to said path switch control signal and to make the coefficient calculation means modify the tap coefficients in accordance with said coefficient control signal, respectively.

11. An identification apparatus as claimed in claim 10, each of said coefficient calculation means modifying the tap coefficients in response to said coefficient control signal which defines a step size, wherein said tap controller comprises:

a counter for counting modification times of the tap coefficients to a predetermined count to produce a count signal when said modification times reach said predetermined count; and a step size switching circuit, which has a first step size and a second step size greater than said first step size and which is connected to said counter, for switching the step size from said first step size to said second step size in response to said count signal; and delivery means for selectively delivering said first and said second step sizes as said coefficient control signal to said coefficient calculation means.

12. An identification apparatus as claimed in claim 11, wherein each of said coefficient calculation means comprises:

a first multiplier for multiplying each of the successively delayed signals by said error signal to produce a first product signal representative of a product of each of the successively delayed signals and said error signal;

a second multiplier for multiplying said first product signal by said coefficient control signal to produce a second product signal representative of a product of said first product signal and said coefficient control signal;

an adder circuit for summing up said second product signal and an additional signal to produce a sum signal representative of a sum of the second product signal and said additional signal; and a memory circuit for memorizing said sum signal as each of the tap coefficients to feed each of the tap coefficients back to said adder circuit as said additional signal.

13. An identification apparatus as claimed in claim 11, wherein said tap controller of each of said first through said K-th adaptive filters further comprises:

a memory section for memorizing the tap numbers as inactive tap numbers assigned to the inactive taps;

a judging circuit coupled to said memory section for judging whether or not each tap number sent from said memory section satisfies a predetermined judgement condition to feed each tap number back to said memory section when said predetermined judgement condition is satisfied and, otherwise, to discard each tap number;

a tap number calculation circuit coupled to said memory section for supplying the tap numbers of the active taps as the active tap numbers to said path switch as the path switch control signal by removing the inactive tap numbers memorized in said memory section; and a minimum coefficient calculation circuit supplied with said active tap numbers and the tap coefficients for obtaining a particular tap number of one of the active taps having a minimum absolute value of the tap coefficients to supply the particular tap number to said memory section.

14. An identification apparatus as claimed in claim 13, wherein said tap controller further comprises:

a maximum coefficient calculation circuit supplied with said active tap numbers and the tap coefficients for obtaining a specific tap number of another one of the active taps having a maximum absolute values of the tap coefficients to produce said specific tap number;

a control tap range calculation circuit connected to said maximum coefficient calculation circuit for calculating, as said predetermined judgement condition, a control tap range which defines a range of the active taps; and means for delivering said predetermined judgement condition to said judging circuit.

15. An identification apparatus as claimed in claim 13, wherein said tap controller further comprises:

a combining circuit for combining each tap number fed back to said memory section and said particular tap number to produce a combined tap number; and an estimation circuit connected to said control tap range calculation circuit and said counter for estimating whether or not the combined tap number satisfies said predetermined judgement condition;

said memory section comprising:

a first memory for memorizing the inactive tap numbers of the inactive taps adjacent to the specific tap number; and a second memory for memorizing the inactive tap numbers of the inactive taps which are not adjacent to the specific tap number.

16. An identification apparatus as claimed in claim 9, wherein each of said first through said K-th adaptive filters is further supplied with said echo signal.

17. An identification apparatus as claimed in claim 16, wherein each of said first through said K-th adaptive filters comprises:

a delay circuit, which defines a first predetermined number of taps and which is supplied with said transmission input signal, for successively delaying said transmission input signal to produce successively delayed signals through the taps, respectively, said taps being assigned with consecutive tap numbers of a group;

a path switch supplied with a path switching control signal and connected to said taps for selecting the taps of a second predetermined number smaller than said first predetermined number to selectively produce the successively delayed signals of the second predetermined number;

coefficient calculation means of the second predetermined number connected to said path switch and supplied with the second predetermined number of the successively delayed signals and said error signal for calculating tap coefficients of the second predetermined number;

production means connected to said path switch and said coefficient calculation means for producing each of the first through the K-th identification signals; and a tap controller connected to said path switch and said coefficient calculation means and supplied with said echo signal for supplying said path switch and said coefficient calculation means with a path switch control signal, a coefficient control signal, and said echo signal to make said path switch switch the taps from one to another in response to said path switch control signal dependent on said echo signal and to make the coefficient calculation means modify the tap coefficients in accordance with said coefficient control signal, respectively.

18. An identification apparatus as claimed in claim 17, wherein said tap controller comprises:

an echo return loss enhancement estimator, which has a predetermined estimator threshold level and which is supplied with said echo signal and said error signal for estimating an echo return loss enhancement with reference to said echo signal and said error signal to compare said echo return loss enhancement with said predetermined estimator threshold level and to produce a switching signal when said echo return loss enhancement exceeds said predetermined estimator threshold level; and a step size switching circuit, which has a first step size and a second step size greater than said first step size and which is connected to said counter, for switching the step size from the first step size to the second step size in response to said switching signal; and delivery means for selectively delivering said first and said second step sizes as said coefficient control signal to said coefficient calculation means.

19. An identification apparatus as claimed in claim 18, wherein each of said coefficient calculation means comprises:

a first multiplier for multiplying each of the successively delayed signals by said error signal to produce a first product signal representative of each of the successively delayed signals and said error signal;

a second multiplier for multiplying said first product signal by said coefficient control signal to produce a second product signal representative of a product of said first product signal and said coefficient control signal;

an adder circuit for summing up said second product signal and an additional signal to produce a sum signal representative of a sum of the second product signal and said additional signal; and a memory circuit for memorizing said sum signal as each of the tap coefficients to feed each of the tap coefficients back to said adder circuit as said additional signal.

20. An identification apparatus as claimed in claim 18, wherein said tap controller of each of said first through said K-th adaptive filters further comprises:

a memory section for memorizing the tap numbers as inactive tap numbers assigned to the inactive taps;

a judging circuit coupled to said memory section for judging whether or not each tap number sent from said memory section satisfies a predetermined judgement condition to feed each tap number back to said memory section when said predetermined judgement condition is satisfied and, otherwise, to discard each tap number;

a tap number calculation circuit coupled to said memory section for supplying the tap numbers of the active taps as the active tap numbers to said path switch as the path switch control signal by removing the inactive tap numbers memorized in said memory section; and a minimum coefficient calculation circuit supplied with said active tap numbers and the tap coefficients for obtaining a particular tap number of one of the active taps having a minimum absolute value of the tap coefficients to supply the particular tap number to said memory section.

21. An identification apparatus as claimed in claim 20, wherein said tap controller further comprises:

a maximum coefficient calculation circuit supplied with said active tap numbers and the tap coefficients for obtaining a specific tap number of another one of the active taps having a maximum absolute values of the tap coefficients to produce said specific tap number;

a control tap range calculation circuit connected to said maximum coefficient calculation circuit for calculating, as said predetermined judgement condition, a control tap range which defines a range of the active taps; and means for delivering said predetermined judgement condition to said judging circuit.

22. An identification apparatus for use in identifying an unknown system by responding to a transmission input signal and a reception input signal which is sent through said unknown system and which includes an impulse response of an echo signal to produce an identification signal representative of a result of identification, said identification apparatus comprising:

a delay circuit, which defines a first predetermined number of taps and which is supplied with said transmission input signal, for successively delaying said transmission input signal to produce successively delayed signals through the taps, respectively, said taps being assigned with consecutive tap numbers;

a path switch supplied with a path switching control signal and connected to said taps for selecting the taps of a second predetermined number smaller than said first predetermined number to selectively produce the successively delayed signals of the second predetermined number;

coefficient calculation means of the second predetermined number connected to said path switch and supplied with the second predetermined number of the successively delayed signals and said error signal for calculating tap coefficients of the second predetermined number;

production means connected to said path switch and said coefficient calculation means for producing the identification signals; and a tap controller connected to said path switch and said coefficient calculation means for supplying said path switch and said coefficient calculation means with a path switch control signal and a coefficient control signal to make said path switch switch the taps from one to another in response to said path switch control signal and to make the coefficient calculation means modify the tap coefficients in accordance with said coefficient control signal, respectively;

said tap controller comprising:
coefficient control signal producing means for selectively producing the coefficient control signal which represent a selected one of a first step size and a second step size greater than said first step size.

23. An identification apparatus as claimed in claim 22, wherein said coefficient control signal producing means comprises:

a counter for counting modification times of the tap coefficients to a predetermined count to produce a count signal when said modification times reach said predetermined count; and a step size switching circuit, which has a first step size and a second step size greater than said first step size and which is connected to said counter, for switching the step size from said first step size to said second step size in response to said count signal; and delivery means for selectively delivering said first and said second step sizes as said coefficient control signal to said coefficient calculation means.

24. An identification apparatus as claimed in claim 22, wherein said coefficient control signal producing means comprises:

an echo return loss enhancement estimator supplied with said error signal and said echo signal and said tap coefficients for estimating an echo return loss enhancement from said error signal and said echo signal to produce said coefficient control signal representative of either of said first and said second step sizes;

a step size switching circuit, which has a first step size and a second step size greater than said first step size and which is connected to said echo return loss enhancement estimator, for switching the step size from said first step size to said second step size in response to said count signal; and delivery means for selectively delivering said first and said second step sizes as said coefficient control signal to said coefficient calculation means.

25. A method of identifying an unknown system by the use of an adaptive filter having a plurality of taps which are assigned with consecutively tap numbers and which are divisible into active and inactive taps, said method comprising the steps of:

classifying said taps into a plurality of tap control subgroups;

preparing a plurality of queue memories which are in one-to-one correspondence to said tap control subgroups and which are for memorizing, in the form of queues, inactive tap numbers of the inactive taps which belong to the tap control subgroups, respectively;

selecting, as a selected tap control subgroup, one of the tap control subgroups that includes the inactive tap numbers memorized in the corresponding queue memory; and successively modifying tap coefficients of the selected tap control subgroup by the use of a step size determined by active tap information related to each of tap coefficients assigned to the active taps.

26. An identification apparatus for use in identifying an unknown system by responding to a transmission input signal and a reception input signal which is sent through said unknown system and which includes an impulse response of an echo signal, said identification apparatus producing an identification signal representative of a result of identification and comprising:

a delay circuit, which defines a first predetermined number of taps divided into a plurality of subgroups and which is supplied with said transmission input signal, for successively delaying said transmission input signal to produce successively delayed signals through the taps, respectively, said taps being assigned with consecutive tap numbers and classified into the subgroups each of which includes active and inactive taps;

a path switch supplied with a path switching control signal and connected to said taps for selecting the taps of a second predetermined number smaller than said first predetermined number to selectively produce the successively delayed signals of the second predetermined number;

coefficient calculation means of the second predetermined number connected to said path switch and supplied with the second predetermined number of the successively delayed signals and said error signal for calculating tap coefficients of the second predetermined number;

production means connected to said path switch and said coefficient calculation means for producing the identification signal; and a tap controller connected to said path switch and said coefficient calculation means for supplying said path switch and said coefficient calculation means with a path switch control signal and a coefficient control signal to make said path switch switch the taps from one to another in response to said path switch control signal and to make the coefficient calculation means modify the tap coefficients in accordance with said coefficient control signal, respectively;

said tap controller comprising:

monitoring means for monitoring active tap information determined by the tap coefficients of the active taps in each subgroup;

varying means coupled to said monitoring means for varying a step size with reference to said active tap information; and supplying means for supplying said step size to the coefficient calculation means to modify the tap coefficients.

27. An identification apparatus as claimed in claim 26, wherein said active tap information is specified by a maximum absolute value of the tap coefficients sent from said coefficient calculation means.

28. An identification apparatus as claimed in claim 26, wherein said active tap information is specified by a total sum of absolute values of the tap coefficients in each subgroup.

29. An identification apparatus as claimed in claim 26, wherein said active tap information is specified by a total sum of coefficient square values of the tap coefficients in each subgroup.

* * * * *